United States Patent
Gill et al.

(10) Patent No.: US 12,551,708 B2
(45) Date of Patent: Feb. 17, 2026

(54) METHODS AND SYSTEMS FOR POSTURE DEPENDENT IMPLANTABLE CARDIOVERTER DEFIBRILLATOR THERAPY

(71) Applicant: Pacesetter, Inc., Sylmar, CA (US)

(72) Inventors: Jong Gill, Valencia, CA (US); Kyungmoo Ryu, Los Angeles, CA (US)

(73) Assignee: Pacesetter, Inc., Sylmar, CA (US)

( * ) Notice: Subject to any disclaimer, the term of this patent is extended or adjusted under 35 U.S.C. 154(b) by 314 days.

(21) Appl. No.: 18/325,453

(22) Filed: May 30, 2023

(65) Prior Publication Data
US 2023/0405335 A1 Dec. 21, 2023

Related U.S. Application Data

(60) Provisional application No. 63/353,647, filed on Jun. 20, 2022.

(51) Int. Cl.
| | | |
|---|---|---|
| A61N 1/365 | (2006.01) | |
| A61N 1/37 | (2006.01) | |
| A61N 1/39 | (2006.01) | |

(52) U.S. Cl.
CPC ..... *A61N 1/36535* (2013.01); *A61N 1/36507* (2013.01); *A61N 1/36542* (2013.01); *A61N 1/36585* (2013.01); *A61N 1/36592* (2013.01); *A61N 1/3706* (2013.01); *A61N 1/3712* (2013.01); *A61N 1/39622* (2017.08)

(58) Field of Classification Search
CPC .................................................. A61N 1/36535
See application file for complete search history.

(56) References Cited

U.S. PATENT DOCUMENTS

| | | |
|---|---|---|
| 8,140,156 B2 | 3/2012 | Zhang et al. |
| 8,478,399 B2 | 7/2013 | Degroot et al. |
| 8,744,572 B1 | 6/2014 | Greenhut et al. |

(Continued)

OTHER PUBLICATIONS

Liu et al. "Orthostatic Increase in Defibrillation Threshold Leading to Defibrillation Failure and Prolonged Cardiac Arrest in a Sitting Position: Lessons from a Patient's Near Fatal Experience" HeartRhythm Case Reports; Mar. 18, 2016 (14 pages).

(Continued)

*Primary Examiner* — Brian T Gedeon
(74) *Attorney, Agent, or Firm* — Dean D. Small; Carroll, Hoette & Butscher, LLC

(57) ABSTRACT

An implantable medical device and computer implemented methods comprise a sensing circuit configured to sense cardiac activity (CA) signals. An accelerometer is configured to be implanted in a patient and obtain accelerometer data along at least one axis. A memory is configured to store program instructions and device parameters associated with each ventricular arrhythmia (VA) therapy in a collection of VA therapies with different levels of intensity. One or more processors execute the program instructions and are configured to analyze the CA signals over one or more cardiac beats, determine a VA episode based on the analysis of the CA signals, determine a posture of the patient based on the accelerometer data in response to the determination of the VA episode, and select a first VA therapy from the collection of VA therapies based on the posture.

20 Claims, 8 Drawing Sheets

(56) References Cited

U.S. PATENT DOCUMENTS

| | | |
|---|---|---|
| 9,072,914 B2 | 7/2015 | Greenhut et al. |
| 9,511,233 B2 | 12/2016 | Sambelasvili |
| 9,717,923 B2 | 8/2017 | Thompson-Nauman et al. |
| 9,789,319 B2 | 10/2017 | Sambelashvili |
| 10,086,206 B2 | 10/2018 | Sambelashvili |
| 2007/0179539 A1* | 8/2007 | Degroot ............ A61N 1/39622 607/5 |
| 2008/0119903 A1* | 5/2008 | Arcot-Krishnamurthy ................ A61N 1/3627 607/17 |
| 2008/0312709 A1 | 12/2008 | Volpe et al. |
| 2010/0331903 A1 | 12/2010 | Zhang et al. |
| 2012/0296228 A1 | 11/2012 | Zhang et al. |
| 2013/0237872 A1 | 9/2013 | Zhang et al. |
| 2016/0213920 A1* | 7/2016 | Rosenberg ........... A61N 1/0551 |
| 2017/0113051 A1* | 4/2017 | Sheldon ............. A61N 1/36535 |
| 2019/0168003 A1 | 6/2019 | Pei |
| 2020/0197714 A1 | 6/2020 | Vitali et al. |
| 2020/0206519 A1 | 7/2020 | Shahandeh et al. |
| 2020/0368536 A1 | 11/2020 | Gill et al. |
| 2021/0345935 A1 | 11/2021 | Gill et al. |

OTHER PUBLICATIONS

Schauerte et al. "Influence of Body Position on Defibrillation Thresholds of Nonthoracotomy Implantable Defibrillators:A Prospective Randomized Evaluation" Department of Cardiology, University Hospital RWTH Aachen, Aachen. Germany; Feb. 24, 1998 (8 pages).

* cited by examiner

METHODS AND SYSTEMS FOR POSTURE DEPENDENT IMPLANTABLE CARDIOVERTER DEFIBRILLATOR THERAPY

CROSS-REFERENCE TO RELATED APPLICATIONS

This application claims priority to U.S. Provisional Patent Application No. 63/353,647, filed 20 Jun. 2022, entitled "METHODS AND SYSTEMS FOR POSTURE DEPENDENT IMPLANTABLE CARDIOVERTER DEFIBRILLATOR THERAPY", which is incorporated herein by reference in its entirety.

BACKGROUND

Embodiments of the present disclosure generally relate to methods and devices for determining a level of shocking energy to deliver to a patient experiencing an abnormal heart condition.

A three-dimensional (3-D) accelerometer that is implanted in a patient may detect movement of the patient during day-to-day activities. For example, an accelerometer, as part of an implantable cardiac monitor (ICM), implantable cardioverter defibrillator (ICD), or another similar implantable medical device (IMD), can detect the posture of the patient based on the position and/or orientation of the implanted device.

The posture of patients having the implanted device has been shown to have an impact on the defibrillation threshold (DFT). The DFT refers to the shock energy necessary to achieve cardioversion (e.g., to return a heart to a normal rhythm from a condition in which the heart is experiencing, for example, a fibrillation dysrhythmia episode such as, but not limited to, a ventricular arrhythmia). For example, the efficacy of ICD therapy can change due to the shift of the heart position and orientation with respect to the shocking coil(s) when the patient is in different postures such as standing, lying down, etc. As such, the patient may experience over-treatment or under-treatment of the detected heart condition.

Under-treatment of a patient's heart condition such as, but not limited to, ventricular arrhythmia, can result in life-threatening circumstances for the patient. Over-treatment of the patient's heart condition may lead the patient to be less compliant with the treatment protocol.

SUMMARY

In accordance with embodiments herein, an implantable medical device (IMD) comprises a sensing circuit configured to sense cardiac activity (CA) signals. An accelerometer is configured to be implanted in a patient and is configured to obtain accelerometer data along at least one axis. A memory is configured to store program instructions and store device parameters associated with each ventricular arrhythmia (VA) therapy in a collection of VA therapies with different levels of intensity. The IMD includes one or more processors that, when executing the program instructions, are configured to analyze the CA signals over one or more cardiac beats, determine a VA episode based on the analysis of the CA signals, determine a posture of the patient based on the accelerometer data in response to the determination of the VA episode, select a first VA therapy from the collection of VA therapies based on the posture, and apply the first VA therapy.

Optionally, the collection of VA therapies further includes a second VA therapy, and the second VA therapy has a greater level of intensity than the level of intensity associated with the first VA therapy. Optionally, in response to determining the posture as one of upright and right sided, the first VA therapy has less than a greatest level of intensity from within the different levels of intensity, and more than a least level of intensity from within the different levels of intensity. Optionally, in response to determining that the VA episode is still occurring after applying the first VA therapy, the one or more processors is further configured to select a second VA therapy that has a greater level of intensity than the first VA therapy. Optionally, in response to determining the posture as one of supine and left sided, the first VA therapy has a lesser level of intensity than if the posture is one of upright and right sided. Optionally, each of the levels of intensity for the collection of VA therapies includes at least one of: i) different energy levels, ii) different types of therapy, or iii) different electrode combination.

Optionally, the IMD further comprises two shocking coils, wherein the collection of VA therapies includes at least one of: i) delivering less than a maximal energy with one coil, ii) delivering less than a maximal energy with two coils, iii) delivering maximal energy with one coil, iv) delivering maximal energy with two coils, or v) delivering antitachycardia pacing (ATP).

Optionally, the one or more processors is further configured to determine the VA episode to be hemodynamically stable or unstable based on at least one of the accelerometer data or the CA signals, and select the first VA therapy from the collection of VA therapies based on the posture and on whether the VA episode is hemodynamically stable or unstable. Optionally, the one or more processors is further configured to determine a heart rate based on the VA episode, and in response to the heart rate being determined an intermediate heart rate, select the VA therapy to have a greater level of intensity when the posture is one of i) upright, ii) right sided, or iii) left sided compared to the level of intensity when the posture is one of i) prone or ii) supine.

Optionally, the IMD is coupled to a lead that is positioned in one of a transvenous, subcutaneous, or subxiphoid position, and wherein the IMD is one of implantable cardioverter defibrillator, pacemaker, cardiac rhythm management device, or defibrillator. Optionally, the IMD is a subcutaneous IMD coupled to an extravascular lead having a first electrode disposed along a distal segment of the lead and a second electrode disposed along a proximal segment of the lead.

In accordance with embodiments herein, a computer implemented method comprises sensing cardiac activity (CA) signals utilizing a sensing circuit implanted within a patient. The method obtains accelerometer data along at least one axis, utilizing an accelerometer implanted within the patient. The method utilizes one or more processors to: i) analyze the CA signals over one or more cardiac beats, ii) determine a VA episode based on the CA signals, iii) determine a posture of the patient based on the accelerometer data, iv) select a first VA therapy from a collection of VA therapies based on the posture, wherein the collection of VA therapies includes a plurality of VA therapies with different levels of intensity, and v) apply the first VA therapy.

Optionally, the collection of VA therapies further includes a second VA therapy, and the second VA therapy has a greater level of intensity than the level of intensity associated with the first VA therapy. Optionally, in response to determining the posture as one of upright and right sided, the first VA therapy has less than a greatest level of intensity from within the different levels of intensity, and more than a least level of intensity from within the different levels of intensity.

Optionally, in response to determining that the VA episode is still occurring after implementing the first VA therapy, the method selects a second VA therapy that has a greater level of intensity than the first VA therapy. Optionally, in response to determining the posture as one of supine and left sided, the first VA therapy has a lesser level of intensity than if the posture is one of upright and right sided.

Optionally, the method further comprises determining the VA episode to be hemodynamically stable or unstable based on at least one of the accelerometer data or the CA signals, and selects the first VA therapy from the collection of VA therapies based on the posture and on whether the VA episode is hemodynamically stable or unstable. Optionally, the method further comprises determining a heart rate based on the VA episode, and in response to the heart rate being determined an intermediate heart rate, selects the VA therapy to have a greater level of intensity when the posture is one of i) upright, ii) right sided, or iii) left sided compared to the level of intensity when the posture is one of i) prone or ii) supine.

Optionally, the method further comprises in response to applying the first VA therapy, analyzing the CA signals over one or more cardiac beats, determining an absence of the VA episode based on the CA signals, and stopping the first VA therapy. Optionally, the method further comprises applying the first VA therapy when the VA episode is determined to be stable, and applying a second VA therapy when the VA episode is determined to be unstable, wherein the first and second VA therapies have different levels of intensity.

DETAILED DESCRIPTION

Figure 1A:
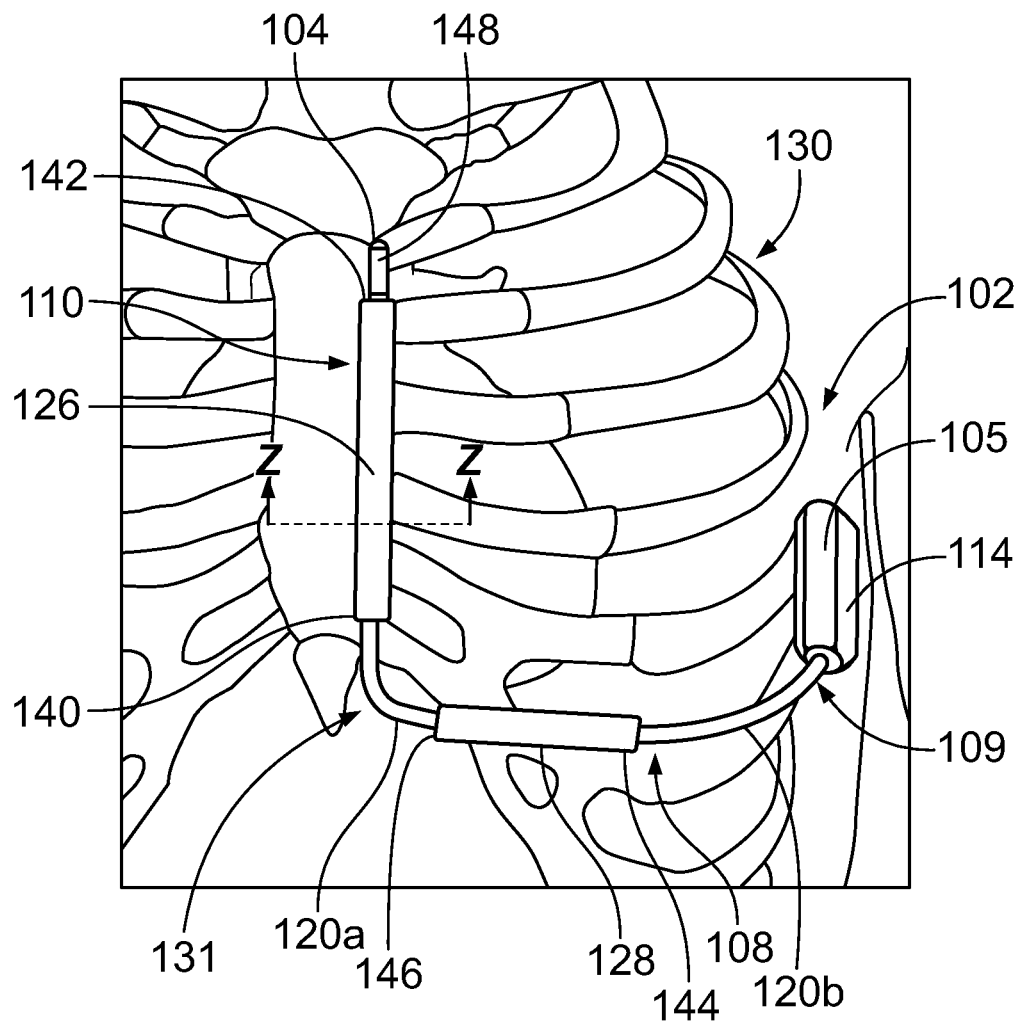
FIG. 1A illustrates a graphical representation of an implantable medical device (IMD) that is configured to apply defibrillation therapy in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The methods described herein may employ structures or aspects of various embodiments (e.g., systems and/or methods) discussed herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. It should be noted that, other methods may be used, in accordance with an embodiment herein. Further, wherein indicated, the methods may be fully or partially implemented by one or more processors of one or more devices or systems. While the operations of some methods may be described as performed by the processor(s) of one device, additionally, some or all of such operations may be performed by the processor(s) of another device described herein.

Embodiments may be implemented in connection with one or more implantable medical devices (IMDs). Non-limiting examples of IMDs include one or more of implantable leadless monitoring and/or therapy devices, and/or alternative implantable medical devices. For example, the IMD may represent a cardioverter defibrillator, pacemaker, cardioverter, cardiac rhythm management device, defibrillator, leadless pacemaker and the like. For example, leadless implantable medical device (LIMD) can include one or more structural and/or functional aspects of the device(s) described in U.S. Pat. No. 9,216,285 "Leadless Implantable Medical Device Having Removable And Fixed Components" which is hereby incorporated by reference in its entirety. Additionally or alternatively, the IMD may include one or more structural and/or functional aspects of the device(s) described in U.S. Pat. No. 8,391,980 "Method And System For Identifying A Potential Lead Failure In An Implantable Medical Device" and U.S. Pat. No. 9,232,485 "System And Method For Selectively Communicating With An Implantable Medical Device", which are hereby incorporated by reference in their entireties.

Additionally or alternatively, the IMD may be a subcutaneous IMD that includes one or more structural and/or functional aspects of the device(s) described in U.S. Pat. No. 10,765,860, titled "Subcutaneous Implantation Medical Device With Multiple Parasternal-Anterior Electrodes"; U.S. Pat. No. 10,722,704, titled "Implantable Medical Systems And Methods Including Pulse Generators And Leads"; U.S. Pat. No. 11,045,643, titled "Single Site Implantation Methods For Medical Devices Having Multiple Leads", which are hereby incorporated by reference in their entireties. Further, one or more combinations of IMDs may be utilized from the above incorporated patents and applications in accordance with embodiments herein.

In some embodiments, the physiologic sensor may be implemented as an accelerometer and may be implemented utilizing all or portions of the structural and/or functional aspects of the methods and systems described in U.S. Pat. No. 6,937,900, titled "AC/DC Multi-Axis Accelerometer for Determining A Patient Activity and Body Position;" U.S. Patent Application Publication 2021/0345935, filed Mar. 5, 2021, "SYSTEM FOR VERIFYING A PATHOLOGIC EPISODE USING AN ACCELEROMETER"; U.S. Patent Application Publication 2021/0345891, filed May 8, 2020, titled "METHOD AND DEVICE FOR DETECTING RESPIRATION ANOMALY FROM LOW FREQUENCY COMPONENT OF ELECTRICAL CARDIAC ACTIVITY SIGNALS"; and U.S. Patent Application Publication 2021/0350931, filed Mar. 8, 2021, titled "METHOD AND SYSTEMS FOR HEART CONDITION DETECTION USING AN ACCELEROMETER", which are expressly incorporated herein by reference in their entireties.

All references, including publications, patent applications and patents, cited herein are hereby incorporated by reference to the same extent as if each reference were individually and specifically indicated to be incorporated by reference and were set forth in its entirety herein.

Terms

The term "composite" refers to a mathematical combination of two or more data values, signals and the like (e.g., mean, sum, average, median, normalization, etc.).

The term "activity level" refers to types of activity currently experienced by a patient, including stationary state, rest state, exercise state, walking state, and the like.

The terms "abnormal", "arrhythmic", and "arrhythmia" are used to refer to events, features, and characteristics of, or appropriate to, an unhealthy or abnormal functioning of the heart.

The terms "ventricular arrhythmia therapy", "VA therapy" and similar phrases, as used herein include, but are not limited to, delivering an electrical stimulation to treat a heart condition. By way of example, treating a heart condition may include, in whole or in part, i) determining an arrhythmia and/or VA episode occurring over time; ii) confirming an arrhythmia identified by an arrhythmia detection process; iii) determining a posture of a patient; iv) instructing the patient to move to a different posture; v) determining hemodynamic stability of the patient; vi) determining the patient's heart rate (HR); and/or vii) delivering (e.g., applying) a therapy based on one or more of posture, HR, and hemodynamic stability.

The terms "beat", "cardiac beat" and "cardiac event" are used interchangeably and refer to both normal and/or abnormal events.

The term "COI" refers to a characteristic of interest. Nonlimiting examples of COIs within CA signals include an R-wave, P-wave, T-wave, S1 heart sound, S2 heart sound, S3 heart sound and/or S4 heart sound. A COI may correspond to a peak, average, mean or other statistical parameter of an individual R, P, R or T-wave peak, S1 heart sound, S2 heart sound, S3 heart sound or S4 heart sound and the like. Non-limiting examples of COI from CA signals collected at an individual electrode(s) include a sensed event (e.g., an intrinsic event or evoked response).

The terms "cardiac activity signal", "cardiac activity signals", "CA signal" and "CA signals" (collectively "CA signals") are used interchangeably throughout to refer to measured signals indicative of cardiac activity by a region or chamber of interest. For example, the CA signals may be indicative of impedance, electrical or mechanical activity by one or more chambers (e.g., left or right ventricle, left or right atrium) of the heart and/or by a local region within the heart (e.g., impedance, electrical or mechanical activity at the AV node, along the septal wall, within the left or right bundle branch, within the purkinje fibers). The cardiac activity may be normal/healthy or abnormal/arrhythmic. An example of CA signals includes EGM signals. Electrical based CA signals refer to an analog or digital electrical signal recorded by two or more electrodes, where the electrical signals are indicative of cardiac activity. Heart sound (HS) based CA signals refer to signals output by a heart sound sensor such as an accelerometer, where the HS based CA signals are indicative of one or more of the S1, S2, S3 and/or S4 heart sounds. Impedance based CA signals refer to impedance measurements recorded along an impedance vector between two or more electrodes, where the impedance measurements are indicative of cardiac activity.

The term "health care system" refers to a system that includes equipment for measuring health parameters, and communication pathways from the equipment to secondary devices. The secondary devices may be at the same location as the equipment, or remote from the equipment at a different location. The communication pathways may be wired, wireless, over the air, cellular, in the cloud, etc. In one example, the healthcare system provided may be one of the systems described in U.S. Provisional Pat. App. No. 62/875,870 entitled METHODS DEVICE AND SYSTEMS FOR HOLISTIC INTEGRATED HEALTHCARE PATIENT MANAGEMENT, to Rupinder, filed Jul. 18, 2019, which are incorporated by reference in its entirety. Other patents that describe example monitoring systems include U.S. Pat. No. 6,572,557, entitled SYSTEM AND METHOD FOR MONITORING PROGRESSION OF CARDIAC DISEASE STATE USING PHYSIOLOGIC SENSORS, filed Dec. 21, 2000, to Tchou et al.; U.S. Pat. No. 6,480,733 entitled METHOD FOR MONITORING HEART FAILURE filed Dec. 17, 1999, to Turcott; U.S. Pat. No. 7,272,443 entitled SYSTEM AND METHOD FOR PREDICTING A HEART CONDITION BASED ON IMPEDANCE VALUES USING AN IMPLANTABLE MEDICAL DEVICE, filed Dec. 14, 2004, to Min et al; U.S. Pat. No. 7,308,309 entitled DIAGNOSING CARDIAC HEALTH UTILIZING PARAMETER TREND ANALYSIS, filed Jan. 11, 2005, to Koh; and U.S. Pat. No. 6,645,153 entitled SYSTEM AND METHOD FOR EVALUATING RISK OF MORTALITY DUE TO CONGESTIVE HEART FAILURE USING PHYSIOLOGIC SENSORS, filed Feb. 7, 2002, to Kroll et. al., which are incorporated by reference in their entireties.

The terms "high-voltage shock" and "HV shock" refer to defibrillation stimulus delivered at an energy level sufficient to terminate a defibrillation episode in a heart, wherein in some embodiments the energy level is defined in Joules to be approximately 40 J or more and/or the energy level is defined in terms of voltage to be approximately 750V or more.

The terms "low voltage shock", "low voltage stimulation", "LV shock" and the like, refer to stimulus delivered at an energy level below an MV shock energy level, and above a pacing pulse energy level, wherein the energy level is defined in Joules, maximum charge voltage and/or pulse width. In connection with an IMD having a transvenous lead, the foregoing terms refer to stimulation that has an energy level that is no more than approximately 20V, in some embodiments to be between approximately 5V-15V and in other embodiments, to be between 7V-10V.

The terms "medium-voltage shock" and "MV shock" refer to defibrillation stimulus delivered at an energy level sufficient to terminate a defibrillation episode in a heart, wherein the energy level is defined in Joules, pulse width, and/or maximum charge voltage. A MV shock from an IMD with a transvenous lead will have a different maximum energy and/or charge voltage than an MV shock from a subcutaneous IMD with a subcutaneous lead. In connection with an IMD having a transvenous lead, the terms medium voltage shock and MV shock refer to defibrillation stimulation that has an energy level that is no more than approximately 25 J, and more preferably approximately 15-25 J and/or has a maximum voltage of no more than approximately 500V, preferably between approximately 100-475V and more preferably between approximately 400-475V. In connection with an IMD having a subcutaneous lead (e.g., parasternal or otherwise), the terms medium voltage shock and MV shock refer to defibrillation stimulation that has an energy level that is no more than approximately 40 J, and more preferably approximately 30-40 J, and/or has a maximum voltage of no more than approximately 35 V, preferably between approximately 25-35 V and more preferably between approximately 20-35 V.

The term "IMD data" shall refer to any and all types of information and signals conveyed from an implantable medical device to a local or remote external device. Non-limiting examples of IMD data include cardiac activity signals (e.g., intracardiac electrogram or IEGM signals), impedance signals (e.g., cardiac, pulmonary or transthoracic impedances), acceleration signatures (e.g., activity signals, posture/orientation signals, heart sounds), pulmonary arterial pressure signals, MCS rpm levels, MCS flow rates, device alerts and the like.

The term "marker" refers to data and/or information identified from CA signals that may be presented as graphical and/or numeric indicia indicative of one or more features within the CA signals and/or indicative of one or more episodes exhibited by the cardiac events. Markers may be superimposed upon CA signals or presented proximate to, and temporally aligned with, CA signals. Non-limiting examples of markers may include R-wave markers, noise markers, activity markers, interval markers, refractory markers, P-wave markers, T-wave markers, PVC markers, sinus rhythm markers, AF markers, VA markers, and other arrhythmia markers. As a further non-limiting example, basic event markers may include "AF entry" to indicate a beginning of an AF event, "in AF" to indicate that AF is ongoing, "AF exit" to indicate that AF has terminated, "T" to indicate a tachycardia beat, "B" to indicate a bradycardia beat, "A" to indicate an asystole beat, "VS" to indicate a regular sinus beat, "Tachy" to indicate a tachycardia episode, "Brady" to indicate a Bradycardia episode, "Asystole" to indicate an asystole episode, "Patient activated" to indicate a patient activated episode. An activity marker may indicate activity detected by activity sensor during the CA signal. Noise markers may indicate entry/start, ongoing, recovery and exit/stop of noise. Markers may be presented as symbols, dashed lines, numeric values, thickened portions of a waveform, and the like. Markers may represent events, intervals, refractory periods, ICM activity, and other algorithm related activity. For example, interval markers, such as the R-R interval, may include a numeric value indicating the duration of the interval. The AF markers indicate atrial fibrillation rhythmic.

The term "defibrillation threshold" or "DFT" shall refer to the shock energy necessary to achieve cardioversion (e.g., to return a heart to a normal rhythm from a condition in which the heart is experiencing a fibrillation dysrhythmia episode). The DFT can vary depending on the patient posture.

The term "level of intensity" or "levels of intensity" when used in connection with describing a therapy (e.g., VA therapy) delivered to a patient, shall refer to one or more of a type of therapy, amount of energy delivered during the therapy and/or electrode combination utilized to deliver the therapy. For example, first and second therapies that have corresponding first and second levels of intensity may refer to an antitachycardia pacing (ATP) therapy and a shock therapy, respectively. As another example, first and second therapies that have corresponding first and second levels of intensity may refer to a low voltage shock and a high voltage shock, respectively. As another example, a first level of intensity may correspond to a first electrode combination (e.g., one shocking electrode), and a second level of intensity may correspond to a second electrode combination (e.g., two shocking electrodes). As yet another example, different levels of intensity may correspond to different levels and/or intensities of therapies that can treat a ventricular arrhythmia. The therapies can have a lower or least level of intensity, such as antitachycardia pacing (ATP), and increase in intensity (e.g., severity, aggressiveness, etc.) such as pacing pulses delivered at a rate greater than a rate associated with ATP (e.g., a rate of at least 30 Hz), using less than full shock strength of one or more coils, a combination of full and less than full shock strength of more than one coil, and full shock strength of one or more coils, which in some cases may be associated with a greatest level of intensity.

The terms "degree of severity" and/or "degree of aggressiveness" can be used interchangeably with the terms "level of intensity" and/or "levels of intensity". Also, the terms "electrode" and "coil" can be used interchangeably.

The terms "multi-phase defibrillation threshold" or "multi-phase DFT" refer to a minimum amount of energy needed to be delivered in an MV shock, in combination with phase II and/or phase III therapies, in order to return a heart to a normal rhythm from a condition in which the heart is experiencing a fibrillation dysrhythmia episode.

The terms "shock-only defibrillation threshold" or "shock-only DFT" refer to a minimum amount of energy needed to be delivered in an HV shock, alone without any phase II and/or phase III therapy, in order to return a heart to a normal rhythm from a condition in which the heart is experiencing a fibrillation dysrhythmia episode.

The term "capacitor" shall mean that one or more single physical component is utilized to perform the corresponding operation (e.g., retain a charge, deliver a shock, maintain a defined initial or later voltage). In some configurations two or more physical capacitors are coupled in parallel or series with one another or utilized independently to delivery corresponding portions of a shock.

The terms "normal" and "sinus" are used to refer to events, features, and characteristics of, or appropriate to, a heart's healthy or normal functioning.

The term "obtains" and "obtaining", as used in connection with data, signals, information and the like, include at least one of i) accessing memory of an external device or remote server where the data, signals, information, etc., are stored, ii) receiving the data, signals, information, etc., over a wireless communications link between the IMD and a local external device, and/or iii) receiving the data, signals, information, etc., at a remote server over a network connection. The obtaining operation, when from the perspective of an IMD, may include sensing new signals in real time, and/or accessing memory to read stored data, signals, information, etc., from memory within the IMD. The obtaining operation, when from the perspective of a local external device, includes receiving the data, signals, information, etc., at a transceiver of the local external device where the data, signals, information, etc., are transmitted from an IMD and/or a remote server. The obtaining operation may be from the perspective of a remote server, such as when receiving the data, signals, information, etc., at a network interface from a local external device and/or directly from an IMD. The remote server may also obtain the data, signals, information, etc., from local memory and/or from other memory, such as within a cloud storage environment and/or from the memory of a workstation or clinician external programmer.

The term "PAP" shall mean pulmonary arterial pressure.

The term "POC" shall mean point-of-care. The term "point-of-care" and "POC", when used in connection with medical diagnostic testing, shall mean methods and devices configured to provide medical diagnostic testing at or near a time and place of patient care. The time and place of patient care may be at an individual's home, such as when providing "at home" point of care solutions. The time and place of patient care may be at a physician's office or other medical facility, wherein one or more medical diagnostic tests may be performed on-site at a time of or shortly after a patient visit and collection of a patient sample. The POC may implement the methods, devices and systems described in one or more of the following publications, all of which are expressly incorporated herein by reference in their entireties: U.S. Pat. No. 6,786,874, entitled "APPARATUS AND METHOD FOR THE COLLECTION OF INTERSTITIAL FLUIDS" issued Sep. 7, 2004; U.S. Pat. No. 9,494,578, entitled "SPATIAL ORIENTATION DETERMINATION IN PORTABLE CLINICAL ANALYSIS SYSTEMS" issued Nov. 15, 2016; and U.S. Pat. No. 9,872,641, entitled "METHODS, DEVICES AND SYSTEMS RELATED TO ANALYTE MONITORING" issued Jan. 23, 2018.

The terms "posture" and "patient posture" refer to postural states and/or activity levels of a patient including supine, prone, lying on a right side, lying on a left side, standing (upright), and the like.

The terms "processor," "a processor", "one or more processors" and "the processor" shall mean one or more processors. The one or more processors may be implemented by one, or by a combination of more than one implantable medical device, a wearable device, a local device, a remote device, a server computing device, a network of server computing devices and the like. The one or more processors may be implemented at a common location or at distributed locations. The one or more processors may implement the various operations described herein in a serial or parallel manner, in a shared-resource configuration and the like.

The term "real-time" refers to a time frame contemporaneous with normal or abnormal episode occurrences. For example, a real-time process or operation would occur during or immediately after (e.g., within minutes or seconds after) a cardiac event, a series of cardiac events, an arrhythmia episode, and the like. For example, the term "real-time" may refer to a time period substantially contemporaneous with an event of interest. The term "real-time," when used in connection with collecting and/or processing data utilizing an IMD, shall refer to processing operations performed substantially contemporaneous with a physiologic event of interest experienced by a patient. By way of example, in accordance with embodiments herein, cardiac activity signals are analyzed in real time (e.g., during a cardiac event or within a few minutes after the cardiac event).

The term "subcutaneous" shall mean below the skin, but not intravenous. For example, a subcutaneous electrode/lead does not include an electrode/lead located in a chamber of the heart, in a vein on the heart, or in the lateral or posterior branches of the coronary sinus.

The term "upright posture" shall mean any and all postures of the patient when the patient is in upright posture including standing or sitting. The upright posture may be identified by an accelerometer reading based on accelerometer data detected and associated with various postures.

The term "alert" shall mean any communication that conveys information or data related to the posture of the patient. The communication can be an output on an output device, an electronic mail, a text message, an auditory and/or vibratory message, etc. The communication can convey information to encourage the patient to adjust to a different posture that is more amenable to responding to a less aggressive ICD therapy compared to their current posture.

The term "IMD" shall mean an implantable medical device. Embodiments may be implemented in connection with one or more implantable medical devices (IMDs). Non-limiting examples of IMDs include one or more of neurostimulator devices, implantable leadless monitoring and/or therapy devices, and/or alternative implantable medical devices. For example, the IMD may represent a subcutaneous cardioverter defibrillator, cardiac monitoring device, pacemaker, cardioverter, cardiac rhythm management device, defibrillator, neurostimulator, leadless monitoring device, leadless pacemaker, and the like. The IMD may measure electrical and/or mechanical information. For example, the IMD may include one or more structural and/or functional aspects of the device(s) described in U.S. Pat. No. 9,333,351, entitled "NEUROSTIMULATION METHOD AND SYSTEM TO TREAT APNEA" issued May 10, 2016 and U.S. Pat. No. 9,044,610, entitled "SYSTEM AND METHODS FOR PROVIDING A DISTRIBUTED VIRTUAL STIMULATION CATHODE FOR USE WITH AN IMPLANTABLE NEUROSTIMULATION SYSTEM" issued Jun. 2, 2015, which are hereby incorporated by reference in their entireties. The IMD may monitor transthoracic impedance, such as implemented by the CorVue algorithm offered by St. Jude Medical. Additionally or alternatively, the IMD may include one or more structural and/or functional aspects of the device(s) described in U.S. Pat. No. 9,216,285, entitled "LEADLESS IMPLANTABLE MEDICAL DEVICE HAVING REMOVABLE AND FIXED COMPONENTS" issued Dec. 22, 2015 and U.S. Pat. No. 8,831,747, entitled "LEADLESS NEUROSTIMULATION DEVICE AND METHOD INCLUDING THE SAME" issued Sep. 9, 2014, which are hereby incorporated by reference in their entireties. Additionally or alternatively, the IMD may include one or more structural and/or functional aspects of the device(s) described in U.S. Pat. No. 8,391,980, entitled "METHOD AND SYSTEM FOR IDENTIFYING A POTENTIAL LEAD FAILURE IN AN IMPLANTABLE MEDICAL DEVICE" issued Mar. 5, 2013 and U.S. Pat. No. 9,232,485, entitled "SYSTEM AND METHOD FOR SELECTIVELY COMMUNICATING WITH AN IMPLANTABLE MEDICAL DEVICE" issued Jan. 5, 2016, which are hereby incorporated by reference in their entireties. Additionally or alternatively, the IMD may be a subcutaneous IMD that includes one or more structural and/or functional aspects of the device(s) described in U.S. application Ser. No. 15/973,195, entitled "SUBCUTANEOUS IMPLANTATION MEDICAL DEVICE WITH MULTIPLE PARASTERNAL-ANTERIOR ELECTRODES" filed May 7, 2018; U.S. Application Serial Number entitled "IMPLANTABLE MEDICAL SYSTEMS AND METHODS INCLUDING PULSE GENERATORS AND LEADS" filed May 7, 2018; U.S. application Ser. No. 15/973,249, entitled "SINGLE SITE IMPLANTATION METHODS FOR MEDICAL DEVICES HAVING MULTIPLE LEADS", filed May 7, 2018, which are hereby incorporated by reference in their entireties. Further, one or more combinations of IMDs may be utilized from the above incorporated patents and applications in accordance with embodiments herein. Embodiments may be implemented in connection with one or more subcutaneous implantable medical devices (S-IMDs). For example, the S-IMD may include one or more structural and/or functional aspects of the device(s) described in U.S. application Ser. No. 15/973,219, entitled "IMPLANTABLE MEDICAL SYSTEMS AND METHODS INCLUDING PULSE GENERATORS AND LEADS", filed May 7, 2018; U.S. application Ser. No. 15/973,195, entitled "SUBCUTANEOUS IMPLANTATION MEDICAL DEVICE WITH MULTIPLE PARASTERNAL-ANTERIOR ELECTRODES", filed May 7, 2018; which are hereby incorporated by reference in their entireties. The IMD may represent a passive device that utilizes an external power source, and/or an active device that includes an internal power source. The IMD may deliver some type of therapy/treatment, provide mechanical circulatory support, and/or merely monitor one or more physiologic characteristics of interest (e.g., PAP, CA signals, impedance, heart sounds).

Additionally or alternatively, embodiments herein may be implemented in connection with an integrated healthcare patient management system or network, such as described in U.S. application Ser. No. 16/930,791, entitled "METHODS, DEVICE AND SYSTEMS FOR HOLISTIC INTEGRATED HEALTHCARE PATIENT MANAGEMENT" filed Jul. 16, 2020, which is incorporated by reference herein in its entirety.

Additionally or alternatively, embodiments herein may be implemented in connection with the methods and systems described in U.S. application Ser. No. 17/194,354, entitled "METHOD AND SYSTEM FOR HEART CONDITION DETECTION USING AN ACCELEROMETER" filed Mar. 8, 2021, which is incorporated by reference herein in its entirety.

Additionally or alternatively, embodiments herein may be implemented in connection with the methods and systems described in U.S. application Ser. No. 16/869,733, entitled "METHOD AND DEVICE FOR DETECTING RESPIRATION ANOMALY FROM LOW FREQUENCY COMPONENT OF ELECTRICAL CARDIAC ACTIVITY SIGNALS", filed May 8, 2020, which is incorporated by reference herein in its entirety.

The term "stable" and "hemodynamically stable" shall mean that the acceleration signature (e.g., accelerometer data, acceleration data) and/or other acquired sensor data associated with or of the IMD that are indicative of heart sounds (HS) may provide data indicative of whether the arrhythmia episode is stable or unstable. HS features related to cardiac valve(s) closing, such as S1, S2, and the like, may be used to determine whether the arrhythmia episode is stable and tolerable, in which case a perfusion to the brain is still maintained.

The term "acceleration signature" shall mean signals detected by an accelerometer or other sensor associated with or of the IMD that are indicative of heart sounds generated during cardiac beats. The acceleration signatures can be analyzed for activity level and characteristics of ventricular events (VEs) to confirm or deny a candidate arrhythmia episode (e.g., a candidate VA episode) determined by arrhythmia determination circuitry. The acceleration signatures can be indicative of heart sounds generated in connection with different postures of a patient, System Overview In accordance with new and unique aspects herein, methods and devices are described that determine that a patient is experiencing a ventricular arrhythmia (VA) and identify the posture of the patient, such as with an accelerometer. If the posture is associated with high defibrillation threshold (DFT), the device can alert the patient to move to another posture that may allow the VA to be resolved with a lesser level of intensity (e.g., lower/lesser shock). The device selects the VA therapy based on the posture and applies the VA therapy. If the VA is not resolved, the device can continue to apply the same therapy or apply a VA therapy with a greater level of intensity.

The methods and devices can also determine one or both of the hemodynamic stability (e.g., stable, unstable) and heart rate (e.g., associated with the VA) of the patient. One or more processors of the device can select a VA therapy based on posture, whether the patient is hemodynamically stable or unstable, and/or the heart rate. Increasing heart rates and/or hemodynamic instability are generally associated with VA therapies that have greater levels of intensity.

A technical advantage of embodiments herein is the ability of an implantable device to select an appropriate level of intensity of a VA therapy based on patient-specific parameters. The implantable device uses this level of intensity of the VA therapy to treat the patient by addressing the VA the patient is currently experiencing without overtreating the patient.

FIG. 1A illustrates a graphical representation of an implantable medical device (IMD) 102 that is configured to apply defibrillation therapy in accordance with embodiments herein. The IMD 102 in the illustrated embodiment is a subcutaneous implantable medical device (SIMD) that is configured to be implanted in a subcutaneous area exterior to the heart. The IMD 102 includes a pulse generator 105 and at least one lead 120a, 120b that is operably coupled to the pulse generator 105. The "at least one lead" is hereinafter referred to as "the lead." Nevertheless, it should be understood that the term, "the lead," may mean only a single lead or may mean more than one single lead. The lead 120 includes a lead body that is mechanically connected to the pulse generator 105 and extends from the pulse generator 105 to a distal tip 104 of the lead 120. In some embodiments the lead 120 is an extravascular lead placed in substernal space, and thus is not within blood vessels of the patient. Additionally, the lead 120 can be implanted through the blood vessels into the heart.

The pulse generator 105 includes a housing that contains power circuitry and energy storage devices for generating high-voltage shocks (HV shocks) for defibrillation therapy. The housing may be electrically conductive to form or constitute an electrode utilized to deliver the HV and/or medium-voltage (MV) shocks. The electrode associated with the housing of the pulse generator 105 is referred to as the "CAN" electrode. The pulse generator 105 may be subcutaneously implanted within a pocket at a mid-axillary position along a portion of the ribcage 130 of the patient.

The lead 120 may be subcutaneously implanted. In particular embodiments, the IMD 102 shown is an entirely or fully subcutaneous SIMD. The SIMD may not include a transvenous lead. The lead 120 in the illustrated embodiment includes a first or proximal segment 108 that extends from the pulse generator 105 along an inter-costal area between ribs. The lead 120 has a proximal end 109 that mechanically couples to the pulse generator 105, and electrically connects to the pulse generator 105 to establish conductive path(s) to the electrodes of the lead 120. The proximal segment 108 may be laterally oriented to extend along an anterior axillary area of the ribcage 130. The lead 120 has a second or distal segment 110 that extends from the proximal segment 108 to the distal tip 104. The distal segment 110 may extend along the sternum (e.g., over the sternum or parasternally within one to three centimeters from the sternum). The intersection between the distal and proximal segments 108, 110 may be located proximate to the xiphoid process of the patient.

The lead 120 includes at least one electrode that is electrically connected to the pulse generator 105 and delivers the HV shocks for defibrillation therapy. In the illustrated embodiment, the lead 120 has a first or primary electrode 126 (e.g., sternal coil) disposed along the distal segment 110 and a second or secondary electrode 128 (e.g., transverse coil) disposed along the proximal segment 108. The electrodes 126, 128 may be referred to as shocking electrodes. The electrodes 126, 128 may be elongated coil electrodes. The thickness of the coil electrodes 126, 128 may be in a range from about 3 mm (9 F) to about 10 mm (30 F). In the illustrated embodiment, the primary electrode 126 is longer than the secondary electrode 128. For example, the primary electrode 126 may be about 9 cm, and the secondary electrode 128 may be about 5 cm. In an embodiment, when the pulse generator 105 generates a HV shock, the pulse generator 105 supplies electrical power to both of the electrodes 126, 128. Both electrodes 126, 128 may deliver the HV shocks based on the received electrical power. The electrodes 126, 128 may concurrently deliver the HV shocks to different areas relative to the heart. In other embodiments, the pulse generator 105 can supply electrical power to one or the electrodes 126, 128. In still further embodiments, the pulse generator 105 can supply electrical power to one or both of the electrodes 126, 128 to deliver HV and/or MV shocks that are less than the full shock strength of the associated coil electrode 126, 128.

The electrodes 126, 128 are spaced apart from each other along the length of the lead 120 by a gap segment 131 of the lead body. The gap segment 131 may be proximate to the xiphoid process. The primary electrode 126 may be positioned along an anterior region of the chest, and the secondary electrode 128 may laterally extend between the primary electrode 126 and the pulse generator 105. The electrodes 126, 128 may be subcutaneously positioned at a level that aligns with the heart of the patient for providing a sufficient amount of energy for defibrillation. Although the lead 120 and primary and secondary electrodes 126, 128 are shown positioned outside the ribs, in some embodiments at least one of the primary and secondary electrodes 126, 128 can be interior with respect to the ribs.

The primary electrode 126 may be oriented transverse to an orientation of the secondary electrode 128 when in the implanted position as shown in FIG. 1A. For example, the primary electrode 126 has a first orientation extending from a proximal end 140 of the electrode 126 to a distal end 142 of the electrode 126 (defined along the length of the lead 120 relative to the pulse generator 105). The first orientation may be generally parallel to the midsternal line of the patient. The secondary electrode 128 has a second orientation extending from a proximal end 144 of the electrode 128 to a distal end 146 of the electrode 128. The second orientation may be transverse to the first orientation. Optionally, the orientation of the secondary electrode 128 may define an angle between about 60 degrees and 120 degrees (e.g., such as 70 degrees to 110 degrees) relative to the orientation of the primary electrode 126. Due to the orientation, the lead 120 may be referred to as an L-shaped lead. The primary electrode 126 may be referred to as a parasternal electrode. The secondary electrode 128 may be referred to as a transverse electrode.

In an alternative embodiment, the IMD 102 may lack the secondary electrode 128. For example, the proximal segment 108 may not have any shocking electrodes. The primary electrode 126 may be the only shocking electrode on the lead 120 that delivers the HV shocks supplied from the pulse generator 105.

Optionally, the lead 120 may include one or more sensing electrodes (not shown) for detection of far field electrogram signals. The sensing electrodes may collect subcutaneous cardiac activity (CA) signals in connection with multiple cardiac beats. The IMD 102 may process the CA signals to detect arrhythmias, such as ventricular arrhythmias (VA) (e.g., ventricular tachycardia (VT), ventricular fibrillation, premature ventricular contractions, etc.) and/or atrial fibrillation. If an arrhythmia is detected, the IMD 102 may automatically take one or more actions depending on characteristics of the arrhythmia, such as type and severity. The actions may include delivering one or more electrical HV shocks (e.g., shock pulses) via the electrodes 126, 128 in an attempt to achieve cardioversion. Optionally, another IMD may be implanted within the heart, such as a leadless pacemaker. The IMD 102 may be configured to communicate with the other intra-cardiac IMD. For example, the intra-cardiac IMD may signal to the IMD 102 when an arrhythmia is detected for the IMD 102 to deliver the HV shocks in response to receiving the signal.

The IMD 102 includes an accelerometer 114 that is used to determine a posture of the patient as further described below. The accelerometer 114 can be within the housing or can of the IMD 102 or external to the housing but located subcutaneously within the patient. In other embodiments, the accelerometer 114 can be included within a separate device that is in communication with the IMD 102. The accelerometer 114 is implanted and/or calibrated in a position and orientation such that, when the patient stands, the accelerometer 114 is located at a reference position and orientation with respect to a global coordinate system that is defined relative to a gravitational direction. For example, the gravitational direction may be along the Z-axis (indicated) while the X-axis is between the left and right arms.

Although the IMD 102 as shown in FIG. 1A includes the lead 120 and electrodes 126 and 128 that are located external to the heart, the embodiments herein can also be incorporated into many other implantable devices, such as transvenous devices, a device located in pectoral regions having one or more lead proximate or into the heart, a leadless device having one or more electrode in physical communication with heart tissue, such as within a ventricle, atrium, and the like.

Figure 1B:
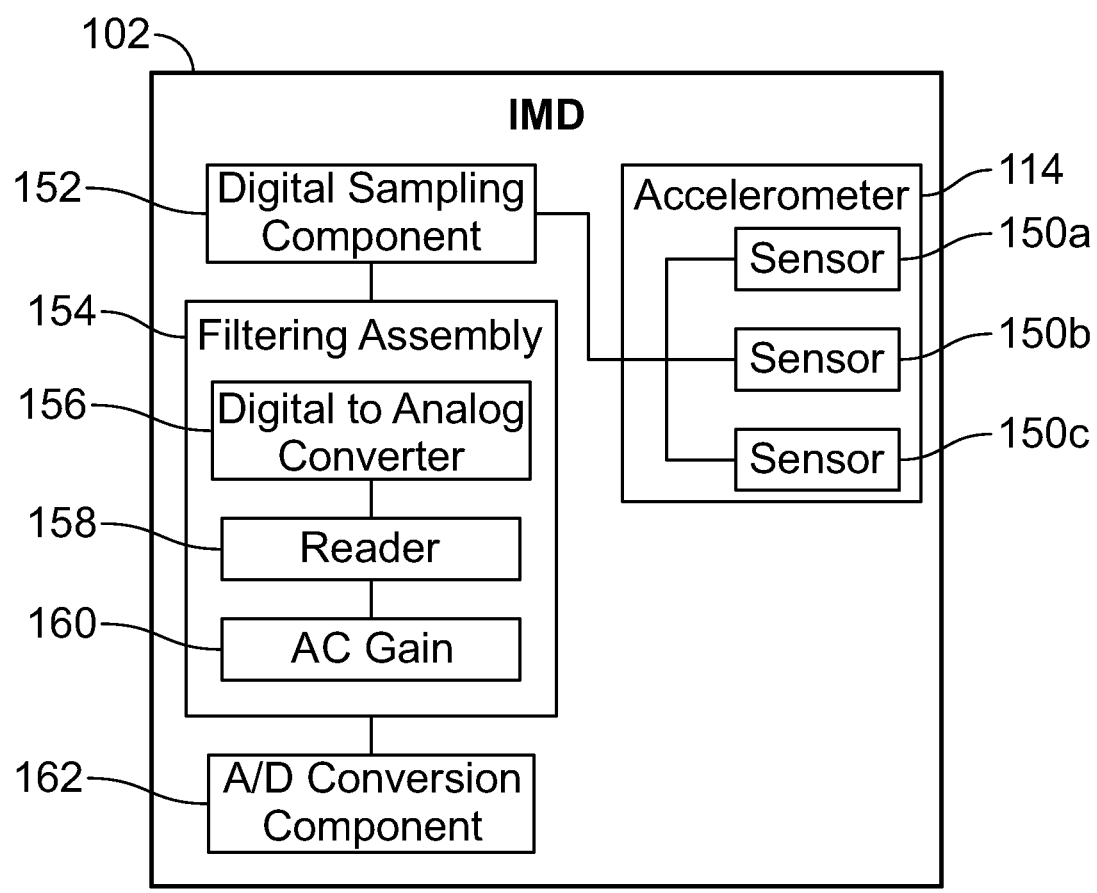
FIG. 1B illustrates a schematic diagram of a portion of the IMD of FIG. 1A in accordance with embodiments herein.

FIG. 1B illustrates a schematic diagram of a portion of the IMD 102 of FIG. 1A in accordance with embodiments herein. In this example, the IMD 102 includes the accelerometer 114, such as within the housing. In some embodiments, the accelerometer 114 may be a chip for placement in the IMD 102. In another embodiment, the accelerometer 114 is formed and operates in the manner described in U.S. Pat. No. 6,937,900, titled "AC/DC Multi-Axis Accelerometer For Determining A Patient Activity And Body Position," the complete subject matter which is expressly incorporated herein by reference in its entirety.

In one embodiment, the accelerometer 114 includes sensors 150a, 150b, 150c that generate first (X), second (Y) and third (Z) accelerometer signals along corresponding X, Y and Z axes (also referred to as first axis accelerometer signals, second axis accelerometer signals and third axis accelerometer signals). The X, Y and Z axes accelerometer signals collectively define a three-dimensional (3D), or multi-dimensional (MD) accelerometer data set. While examples herein are described in connection with an accelerometer 114 that generates accelerometer signals along three orthogonal axes, it is recognized that embodiments may be implemented wherein accelerometer signals are generated along one axis, two or more axes, and/or more than three axes.

The IMD 102 may include sensors (not shown) that monitor and receive signals from the X, Y and Z axes. In one embodiment, the individual X, Y and Z signals are received by a digital sampling component 152 that receives a digital input. Coupled to the digital sampling component 152 is a filtering assembly 154 that may include a digital to analog converter 156 to form an alternating current (AC) signal, a reader device 158, and an AC gain device 160. While in this embodiment, the filtering assembly includes the devices provided, in other examples, other devices may be utilized to filter the digital input signal for processing.

The IMD 102 may also include an analog to digital conversion component 162, along with a position, or direct current (DC) component. In one example, the analog to digital conversion component may be an 8-bit analog to digital converter (ADC). The evaluation version of the monitoring system 100 may provide 3-axes (X and Y along the chip, Z normal to the chip) DC-coupled posture signal corresponding to 3 orthogonal directions as well as 3-axes AC-coupled activity signal. In one embodiment, each of the 6 signals may be sampled at 100 Hz and accumulated over 1 sec for a total of 12 signals ([X/Y/Z], [posture/activity], [100/1 Hz]). This multi-dimensional (MD) accelerometer data may be used to describe embodiments herein.

While described as a digital signal in relation to FIG. 1B, in other embodiments the signal may be an analog signal, filtered, amplified, etc. The accelerometer data signals may be recorded in a data storage of the accelerometer 114, of the IMD 102, of a remote device etc. Alternatively, the accelerometer data set may be collected from a remote device, or received from a storage device coupled to the accelerometer. To this end, the accelerometer data set may be a multi-dimensional accelerometer data set.

The accelerometer sensors 150 may collect accelerometer signals from one, two or more axes. The accelerometer signals may come from at least one of the X-axis, Y-axis, or Z-axis or at least two of the X-axis, Y-axis, or Z-axis. In one example, the accelerometer signals may be collected from all three axes.

The IMD 102 may also include one or more processors for implementing algorithms that use accelerometer data. In one example, a diagnosis algorithm can be provided for detecting arrhythmias, syncope, fainting, falls, strokes, heart attacks, or the like. In one example, the diagnosis algorithm is the diagnosis algorithm described and disclosed in U.S. Patent Application Publication 2021/0345935 filed Mar. 5, 2021, entitled "System For Verifying A Pathologic Episode Using An Accelerometer" that is incorporated in full by reference herein.

In one example, the IMD 102 includes a three-dimensional (3D) accelerometer based posture algorithm that calculates parameters including extent of right (ETR) and extent of supine (ETS). The final posture of the patient can then be predicted, or identified, based on the values of ETR and ETS. The ETR provides the degree of the device tilting or flipping either to the left or right across the long axis. The expected ETR value should be close to zero when subjects have a standing posture. In some embodiments the posture algorithm can be activated at certain time(s). By not continuously obtaining and calculating acceleration data to determine the posture, battery life of the IMD 102 is saved. In one example, the posture algorithm is the posture algorithm described and disclosed in U.S. Ser. No. 63/363,757 filed Apr. 28, 2022, entitled "System For Determining Change in Position of an Implanted Medical Device Within an Implant Pocket" that is incorporated in full by reference herein.

In some embodiments, the IMD 102 can be, or include capabilities of, a dual-chamber stimulation device capable of treating both fast and slow arrhythmias with stimulation therapy, including cardioversion, defibrillation, anti-tachycardia pacing (ATP) and pacing stimulation, as well as being capable of detecting heart failure, evaluating its severity, tracking the progression thereof, and controlling the delivery of therapy and warnings in response thereto. The IMD 102 may be controlled to sense atrial and ventricular waveforms of interest, discriminate between two or more ventricular waveforms of interest, deliver selected stimulus pulses or shocks based on at least one of a patient's posture, the patient's heart rate, and whether the patient is hemodynamically stable or unstable, and inhibit application of a stimulation pulse to a heart based on the discrimination between the waveforms of interest and the like.

Figure 2A:
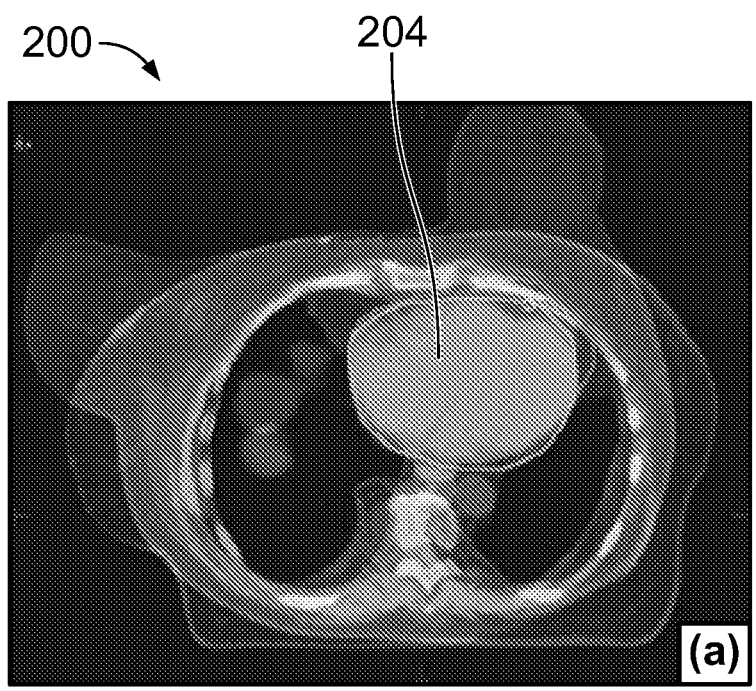
FIGS. 2A and 2B illustrate radiological images (e.g., CT images) that show a shift in the patient's heart when the patient is prone and supine, respectively.
Figure 2B:
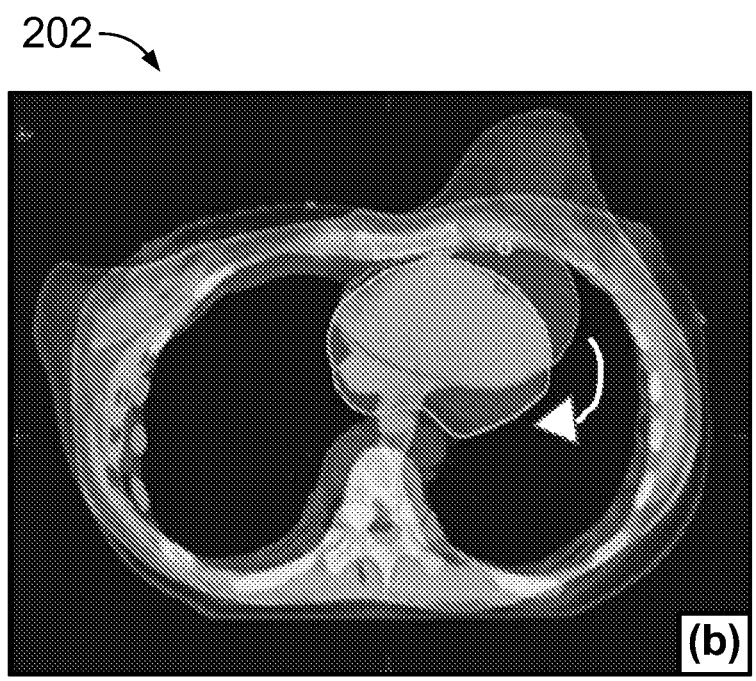

FIGS. 2A and 2B illustrate radiological images 200, 202 (e.g., CT images) that show a shift in the patient's heart 204 when the patient is prone and supine, respectively. In FIG. 2A, the patient is in a prone position. The heart 204 is compressed against the rib cage, but shifts away from the rib cage in FIG. 2B as the patient's position changes to supine, and thus away from the external coils (e.g., primary and secondary electrodes 126, 128 (FIG. 1A), other physically fixed electrodes, etc.). Although not shown in FIGS. 2A and 2B, for patients with the subcutaneous IMD 102 implanted on the left side of the body, the heart 204 shifts more toward the IMD 102 and away from the sternal portion of the lead (e.g., the distal segment 110 and primary electrode 126) when the patient lies on their left side. Conversely, the heart 204 will shift away from the IMD 102 and toward the sternal lead if the patient is lying on their right side.

Additionally, when the patient is lying on their left side, the IMD 102 that is implanted on the left side will be squeezed against the body, potentially leading to shock impedance reduction due to a smaller gap between the IMD 102 and the left sternum. As such, the patient's posture has a significant impact on the efficacy of ICD therapy and it is a technical advantage of the embodiments herein to adjust the ICD therapy, implemented by the IMD 102, depending at least upon the posture of the patient at the time of ICD therapy delivery.

The available ICD therapies can be predetermined in order of level or degree of intensity, severity, and/or aggressiveness. For example, the least aggressive ICD therapy can be ATP while a most aggressive ICD therapy can be the delivery of maximal shock energy from all available shocking coils. In addition, a plurality of intermediate levels of ICD therapy can be determined. In some embodiments, if two or N shocking coils are available for ICD therapy (e.g., two coils, electrodes 126, 128, are shown in FIG. 1), the ICD therapy levels can be adjusted and/or selected to apply i) less than a maximal energy with one coil, ii) less than a maximal energy with at least one of two coils (i.e., wherein two coils are used and one or both is less than maximal energy), iii) maximal energy with one coil, or iv) maximal energy with two or N coils. The selection of which coil is used to provide the identified amount of shock can also be predetermined and may be dependent on the type of therapy required.

In some embodiments, when VA is detected by the IMD 102, the IMD 102 initiates an on-demand posture measurement. The resultant posture is used to guide the aggressiveness of ICD therapy. For example, upright and right sided posture may be assigned to deliver ICD therapies that are relatively aggressive (but not the maximum intensity) such as "maximal energy with one coil". If this therapy does not resolve the VA, the device may shock the patient with VA therapy that has a greater level of intensity, such as "maximal energy with two coils". If the patient is in the supine or left sided posture, an initial ICD therapy may be less aggressive, such as starting with ATP. If the less aggressive therapy does not convert the VA, a more aggressive therapy (e.g., VA therapy having a greater level of intensity) can be applied.

Some postures, such as supine, can allow a less aggressive therapy to be used to convert the VA. In order to increase the chance of successful conversion of the VA, in some cases, the IMD 102 can alert the patient, such as through an associated application on a smart phone, to encourage the patient to adjust to a different posture that is more amenable to starting with a less aggressive ICD therapy. The IMD 102 can continue to monitor to determine the posture of the patient; however, the IMD 102 will not wait for the patient to respond to the request for a change in posture before applying the selected VA therapy.

Figure 3:
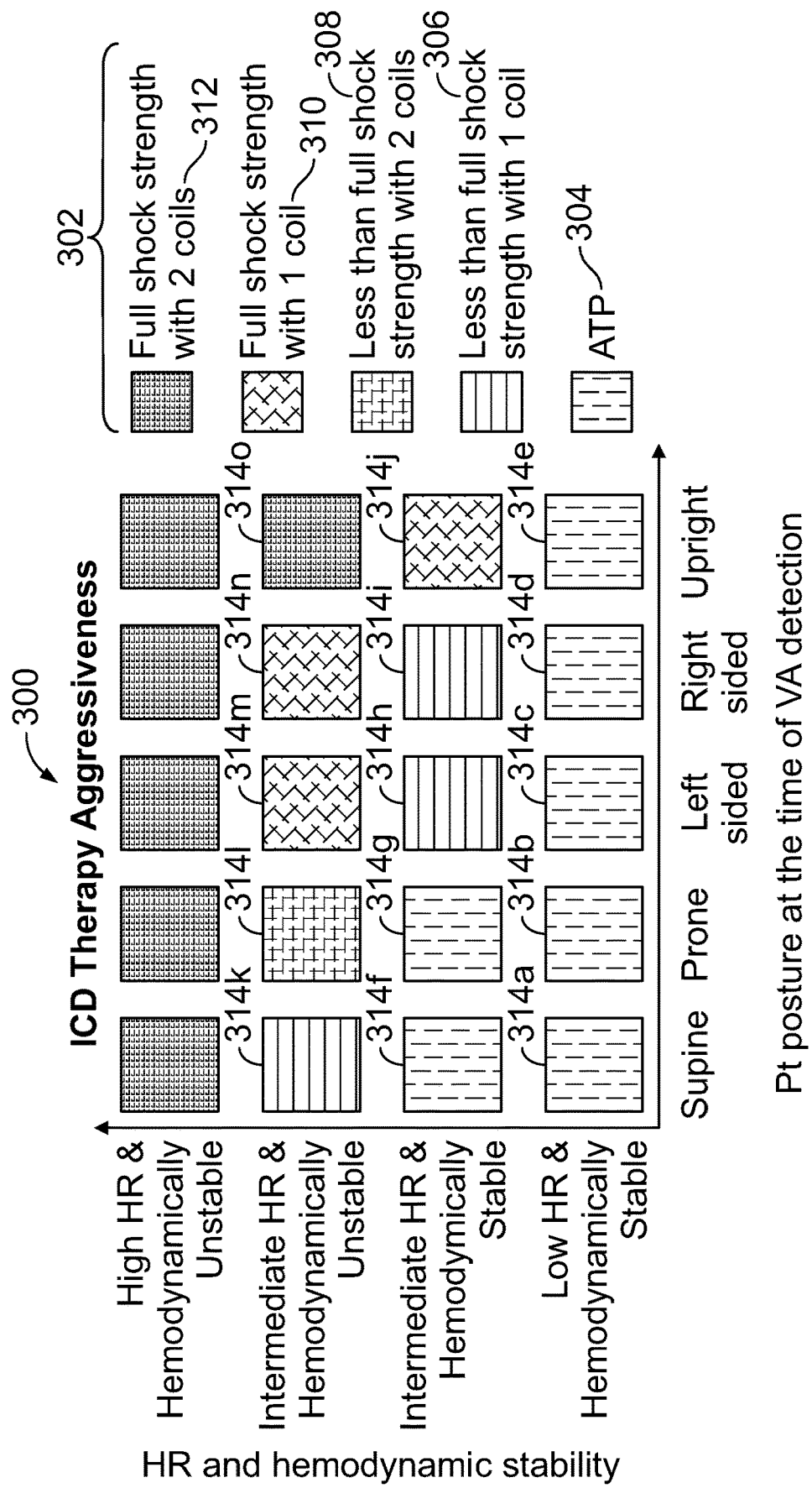
FIG. 3 illustrates a grid of a plurality of IMD and/or implantable cardioverter defibrillator (ICD) therapies having different levels of intensity or aggressiveness to be administered based on the patient's posture, ventricular arrhythmia (VA) rate (e.g., heart rate), and hemodynamic stability in accordance with embodiments herein.

In some embodiments, additional factors, such as heart rate and whether the patient is hemodynamically stable or unstable can be used together with the posture to determine the aggressiveness of ICD therapy. FIG. 3 illustrates a grid 300 of a plurality of ICD therapies having different levels of intensity or aggressiveness to be administered based on the posture, VA rate (e.g., heart rate (HR)), and hemodynamic stability in accordance with embodiments herein. The IMD 102 can use information, such as that displayed in the grid 300, to determine a level of intensity for the first VA therapy to be administered to the patient. The determination of the hemodynamic stability of the patient (e.g., stable, unstable) is discussed further below with respect to FIG. 5. For example, a memory of the IMD 102 can store device parameters associated with each of the VA therapies.

Turning to FIG. 3, a collection of VA therapies 302 is shown vertically along the right-hand side of the ICD Therapy Aggressiveness grid 300. The therapies have different levels of intensity. For example, the least severe (e.g., least aggressive) therapy shown is ATP 304. The therapies increase in levels of intensity from i) ATP 304 (which may be delivered from shocking coil(s) or another electrode (e.g., leadless pacer in the heart)), ii) use of less than the full shock strength with one coil 306, iii) use of less than full shock strength with two coils 308, iv) use of full shock strength with one coil 310, and v) use of full shock strength with two coils 312. It should be understood that other VA therapies (e.g., more intense, severe, or aggressive therapies, intermediate intensity with respect to those shown, etc.) may be used depending on the capabilities of the IMD 102 and the needs of the patient.

Accordingly, in some embodiments the collection of VA therapies 302 includes i) therapies at different energy levels (e.g., 10 J shock, 15 J shock, J shock, etc.), ii) different types of therapy (e.g., ATP, shock, biphasic shock wherein in a first phase the current runs from the first to the second electrode via the patient's heart and then the current reverses on the second phase, combination of two or more types of therapy, etc.) and iii) different electrode combinations (e.g., full or partial shock with primary electrode 126, full or partial shock with secondary electrode 128, full and/or partial shocks with both primary and secondary electrodes 126, 128, etc.).

The vertical axis plots HR and hemodynamic stability while the horizontal axis plots the patient's posture at the time of VA detection. In general, hemodynamically unstable indicates a VA episode that may be life threatening. The HR can be defined as a low HR being approximately 150 bpm, an intermediate HR being approximately 171 bpm, and a high HR being approximately 214 bpm. Ranges of HR can be determined and may be different depending upon whether the patient is hemodynamically stable or unstable. Also, ranges of the HRs can overlap each other depending on whether the patient is hemodynamically stable or unstable. In other embodiments, low, intermediate, and high HR can be determined by comparing the HR to different thresholds. In some cases, the heart rate and/or heart rate ranges may be set based on the patient, such as by a health care practitioner.

Referring to the grid 300, when the HR is lower and the patient is hemodynamically stable, a low or the lowest VA therapy can be applied, such as ATP 304. In this example, ATP 304 is applied for all postures, indicated by blocks 314a, 314b, 314c, 314d, 314e. When the HR is within an intermediate HR range or above an intermediate HR threshold and the patient is hemodynamically stable, the VA therapy will vary depending upon the identified posture. For example, if the patient is supine or prone, the lowest VA therapy (e.g., ATP 304), indicated with blocks 314f, 314g, is selected. If the patient is lying either on their left side or right side, an increasingly aggressive VA therapy is selected, such as shocking the patient with less than a full shock strength with one coil 306, indicated with blocks 314h, 314i. If the patient is upright, an even more aggressive VA therapy is selected, such as full shock strength with one coil 310, indicated with block 314j. This can be because the supine posture on the left side of the grid 300 can have a lower DTF than the prone posture, the prone posture can have a lower DTF than the left sided posture, and so on across the grid 300. This provides the technical advantage of selecting an appropriate level of treatment for the patient and avoiding over-treatment by applying a higher level of shock than is needed to resolve the VA.

If the patient's HR is within the intermediate HR range and/or exceeding a predetermined threshold, and the patient is hemodynamically unstable, the level of VA therapy may increase for each of the postures as indicated with blocks 314k, 314l, 314m, 314n, 314o. In some embodiments, if the posture is upright, the HR is in the intermediate range, and the patient is hemodynamically unstable, the most aggressive therapy, such as full shock strength with two coils 312 may be selected. When the patient is supine, a less severe therapy may be selected compared to the prone, left sided, right sided, and upright positions.

If the patient's HR is high or exceeds a high HR threshold and the patient is hemodynamically unstable, the VA therapy that has the greatest level of intensity can be selected. For example, in the grid 300 the full shock strength with two coils 312 is used for each posture.

The IMD 102 can continually monitor the posture, HR, and hemodynamic stability to adjust the level of intensity associated with the VA therapy selected for the patient. For example, if the HR is high and the patient is hemodynamically unstable, in some embodiments, for all patient postures the patient will receive the VA therapy having the greatest level of intensity (e.g., full shock strength with two coils 312). If the IMD 102 determines that the HR decreases to the intermediate range, the IMD 102 can select a different, less severe, intermediate VA therapy if the posture is supine, prone, left sided, or right sided. In some embodiments, if the posture is supine, the VA therapy may be less aggressive than for any other posture. This has the technical advantage of adjusting the VA therapy to an appropriate level such that the patient receives therapeutic benefit without the additional discomfort of more severe VA therapies that may be unnecessary due to the position of the heart with respect to the IMD 102 and associated electrodes 126, 128.

In accordance with new and unique aspects, the IMD 102 delivers (e.g., applies) a particular treatment for the medical condition of VA (e.g., VA episode(s)). The treatment of the VA is selected from the collection of VA therapies 302, and the treatment is selected based on the current posture of the patient. In some cases, the patient's instant medical condition (e.g., heart rate and/or hemodynamic stability) are also used to select the treatment of the VA from the collection of VA therapies 302.

Further, the IMD 102 delivers the particular treatment which transforms the patient's heart from an arrhythmia state to a normal sinus rhythm state. As discussed in FIGS. 4 and 5, the IMD 102 also monitors the heart sounds, CA signals, etc., as well as the patient's posture, heart rate, and/or hemodynamic stability and adjusts the particular treatment that is applied to the patient as the patient's condition changes.

In addition to the VA therapies 304, 306, 308, 310, 312, the collection of VA therapies 302 can further include any of the multi-phase therapies and/or multi-phase DFT therapies described in US Patent Application Publication 2020/0206519, titled "Method and Device for Delivering Multi-Phase Defibrillation Therapy," filed Dec. 20, 2019, the complete subject matter which is expressly incorporated herein by reference in its entirety. Multi-phase therapies can include additional therapies that can be combined with a shocking therapy and/or initial shocking therapy to return a heart to a normal rhythm.

The assignment of various posture, heart rate, and hemodynamic-specific ICD therapy can be programmable depending on, for example, the shape, size, and/or orientation of the patient's heart, although other factors may also be considered (e.g., weight, size, medical history, etc.). For example, a health care provider may choose to apply VA therapies with a greater level of intensity in certain conditions based on patient requirements, such as by selecting full shock strength with two coils 312 for blocks 314m and 314n, and full shock strength with one coil 310 for block 314l.

The ICD therapy options of grid 300 based on posture, HR and hemodynamic stability are applicable to many types of IMDs and ICDs, such as transvenous, subcutaneous, and subxiphoid approach. Furthermore, the success of the ICD therapy (e.g., intensity with respect to posture) can be stored, such as in a memory of the IMD 102, and the aggressiveness of the therapy for a particular patient may be updated accordingly. Therefore, technical advantages of the use of posture detection to determine the level of therapy are that the patient may be spared from painful shocks in cases where the ATP 304 and/or other less severe therapies successfully terminate the VA episode, and the device longevity can be improved by providing less energy intensive therapies.

Figure 4:
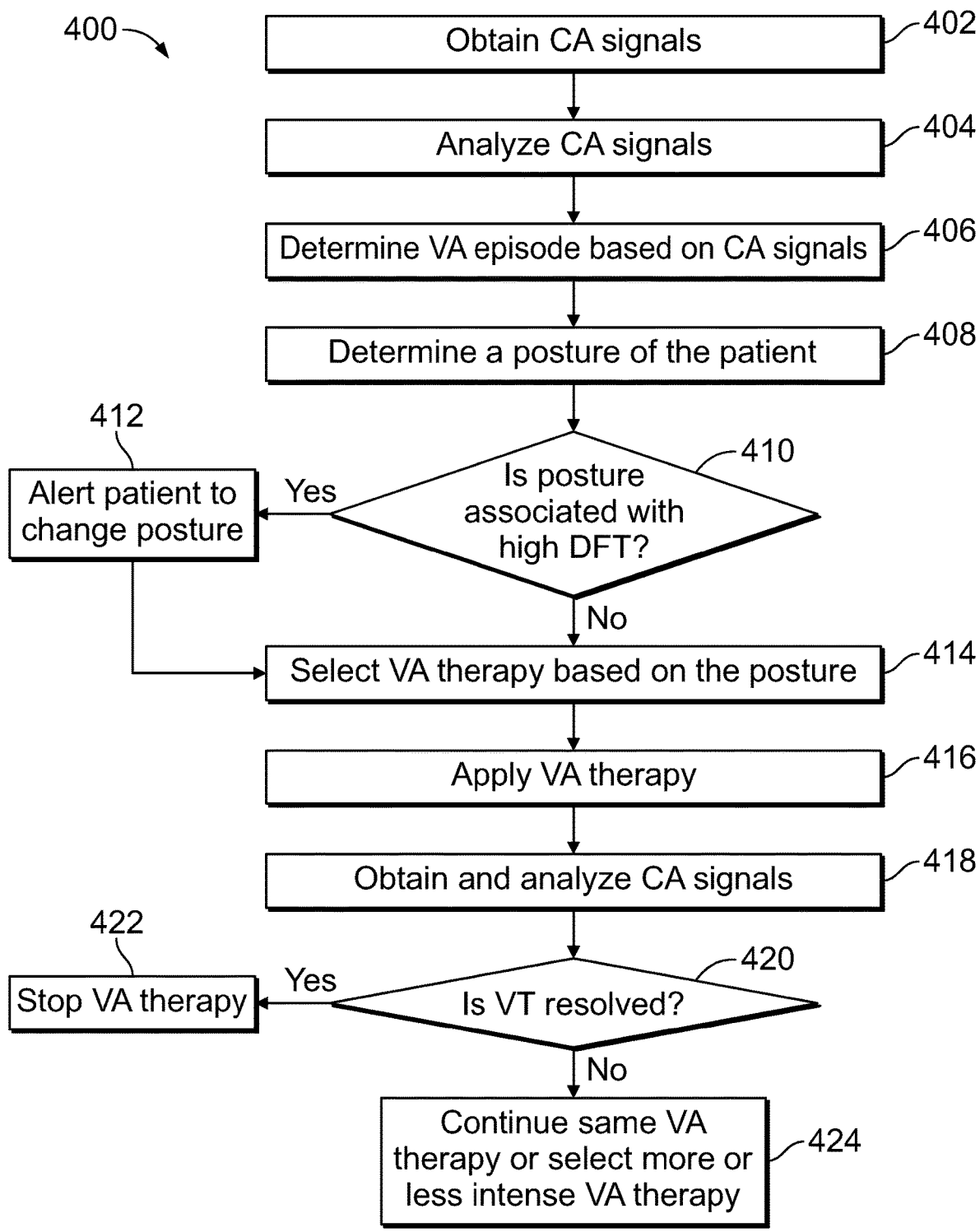
FIG. 4 illustrates a computer-implemented method for determining VA episode(s) and selecting a VA therapy based on a patient's posture in accordance with embodiments of the present technology.

FIG. 4 illustrates a computer-implemented method 400 for determining VA episode(s) and selecting a VA therapy based on a patient's posture in accordance with embodiments of the present technology. In one example, the method 400 is performed utilizing the CA signals and acceleration signatures detected and retrieved by the systems and methods described herein. The operations of FIG. 4 may be implemented by hardware, firmware, circuit(s), circuitry and/or one or more processors housed partially and/or entirely within the IMD 102, a local external device, remote server or more generally within a health care system. Optionally, the operations of FIG. 4 may be partially implemented by an IMD 102 and partially implemented by a local external device, remote server or more generally within a health care system. For example, the IMD 102 includes IMD memory and one or more IMD processors, while each of the external devices/systems (e.g., local, remote or anywhere within the health care system) include external device memory and one or more external device processors. It should be recognized that while the operations of method 400 are described in a somewhat serial manner, one or more of the operations of method 400 may be continuous and/or performed in parallel with one another. For example, the various operations of the IMD 102 may be continuous and/or performed in parallel with one another and/or other functions of the IMD 102.

Figure 6:
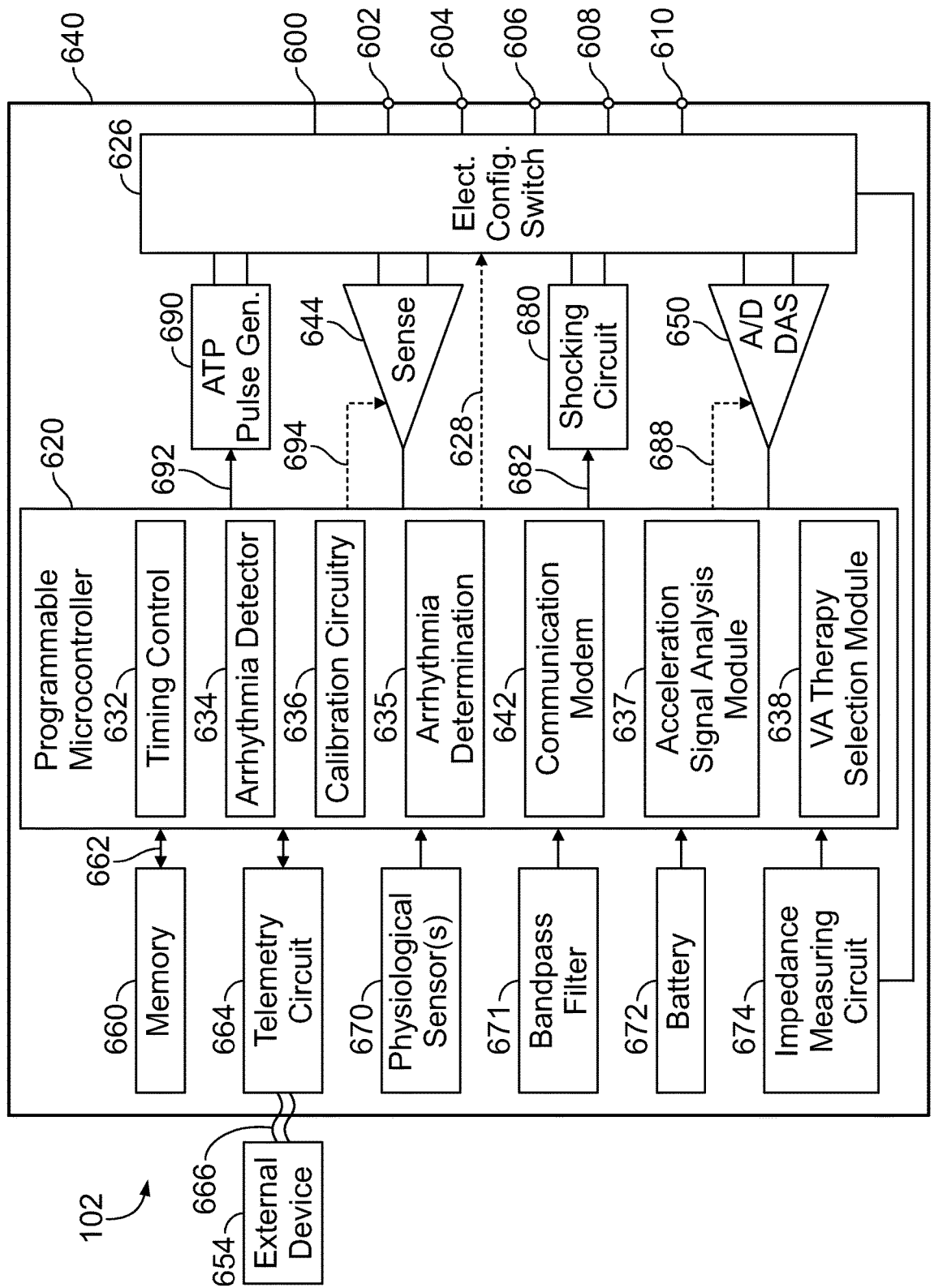
FIG. 6 shows an example block diagram of the IMD formed in accordance with embodiments herein.

Beginning at 402, the one or more processors of the IMD 102 obtain CA signals at the sensing electrodes during cardiac beats as discussed with respect to FIGS. 1A and 6.

At 404, the one or more processors of the IMD 102 analyze the CA signals to assess the presence or absence of an arrhythmia episode (e.g., a VA episode). In one example, arrhythmia detector 634 of FIG. 6, discussed further below, analyzes the CA signals to assess the rate of cardiac beats, the morphology of the QRS complexes, the duration of the QRS complexes, the AR intervals, T-wave morphology, and the like. Upon detection of an arrhythmia episode, the arrhythmia detector 634 transmits a signal to the one or more processors indicating that an arrhythmia episode (e.g., a VA episode) is presented. Optionally, the one or more processors record an ensemble of cardiac beats and utilize a mathematical operation (e.g., averaging, mean, median, and the like) to combine the CA signals to form resultant CA signals that are analyzed for the presence of an arrhythmia.

At 406, the one or more processors of the IMD 102 determine a VA episode based on the CA signals. For example, the VA episode can be one of slow tachycardia, fast tachycardia, fibrillation, premature ventricular contractions (PVCs), and the like.

At 408, the one or more processors of the IMD 102 determine a posture of the patient, such as by obtaining acceleration signatures at a physiological sensor, such as the accelerometer 114 (FIG. 1B) of the IMD 102 that are indicative of activity level and heart sounds generated during the cardiac beats. In one example, the one or more processors obtain the acceleration signatures from or about one or more axes, X, Y, or Z, of the accelerometer 114. The acceleration signatures may be for the same series of cardiac beats as the CA signals. Additionally, or alternatively, the acceleration signatures may be for a series of cardiac beats following the cardiac beats for which the CA signals were obtained. Optionally, the acceleration signatures may be for a series of cardiac beats that include at least some cardiac beats of the series of cardiac beats as the CA signals and cardiac beats following the same series of cardiac beats as the CA signals. For example, the one or more processors can determine that the patient posture is supine, prone, left sided, right sided, upright, etc.

At 410, the one or more processors of the IMD 102 determine whether the posture is associated with high DFT. In some embodiments, upright and right sided postures are both associated with high DFT, which in some cases can require a VA therapy with a greater level of intensity to treat.

If the posture is associated with high DFT, the method optionally flows to 412 and the one or more processors of the IMD 102 can alert the patient to change posture, such as to move to a supine, prone or left sided posture. For example, the IMD 102 can send a communication to a patient app on the patient's smart phone and the smart phone can provide an auditory, visual, or vibratory alert. However, in most cases, the sending of the alert will not delay the treatment of the patient. The advantage of sending the alert may be to enable the use of a less severe VA therapy if the patient adopts a posture associated with a lower DTF and the VA is not resolved with the initial or current VA therapy.

At 414, the one or more processors of the IMD 102 select a VA therapy based on the posture determined at 408. As the IMD 102 prepares to administer the selected VA therapy and administers or applies the therapy, in some embodiments, the one or more processors of the IMD 102 can, in parallel, again identify the posture of the patient (block 408). If the patient's posture has changed and is no longer associated with high DFT, the one or more processors can dynamically adjust the level of intensity of the instant selected VA therapy.

At 416, the one or more processors of the IMD 102 apply the VA therapy. In some cases that shock the patient with all or portions of one or more coils, an intermediate therapy such as ATP may be applied during the ramp up period of the coil(s).

At 418, the one or more processors of the IMD 102 obtain and analyze the CA signals, and at 420 determine if the VA episode is resolved and normal rhythm has returned (e.g., such as by determining an absence of the VA episode). If yes, at 422, the one or more processors of the IMD 102 can stop the VA therapy and return to normal monitoring and/or pacing operations. In some embodiments some low level of intensity VA therapy (e.g., ATP) may be maintained, such as for a predetermined amount of time.

If the VA episode is not resolved at 420, at 424 the one or more processors of the IMD 102 can continue the current VA therapy or select a VA therapy that has a greater level of intensity. The one or more processors can continue to obtain and analyze the CA signals to determine the status of the VA episode (blocks 418 and 420), and identify the posture of the patient (block 408) to determine whether a VA therapy that has a lesser level of intensity is appropriate.

Figure 5:
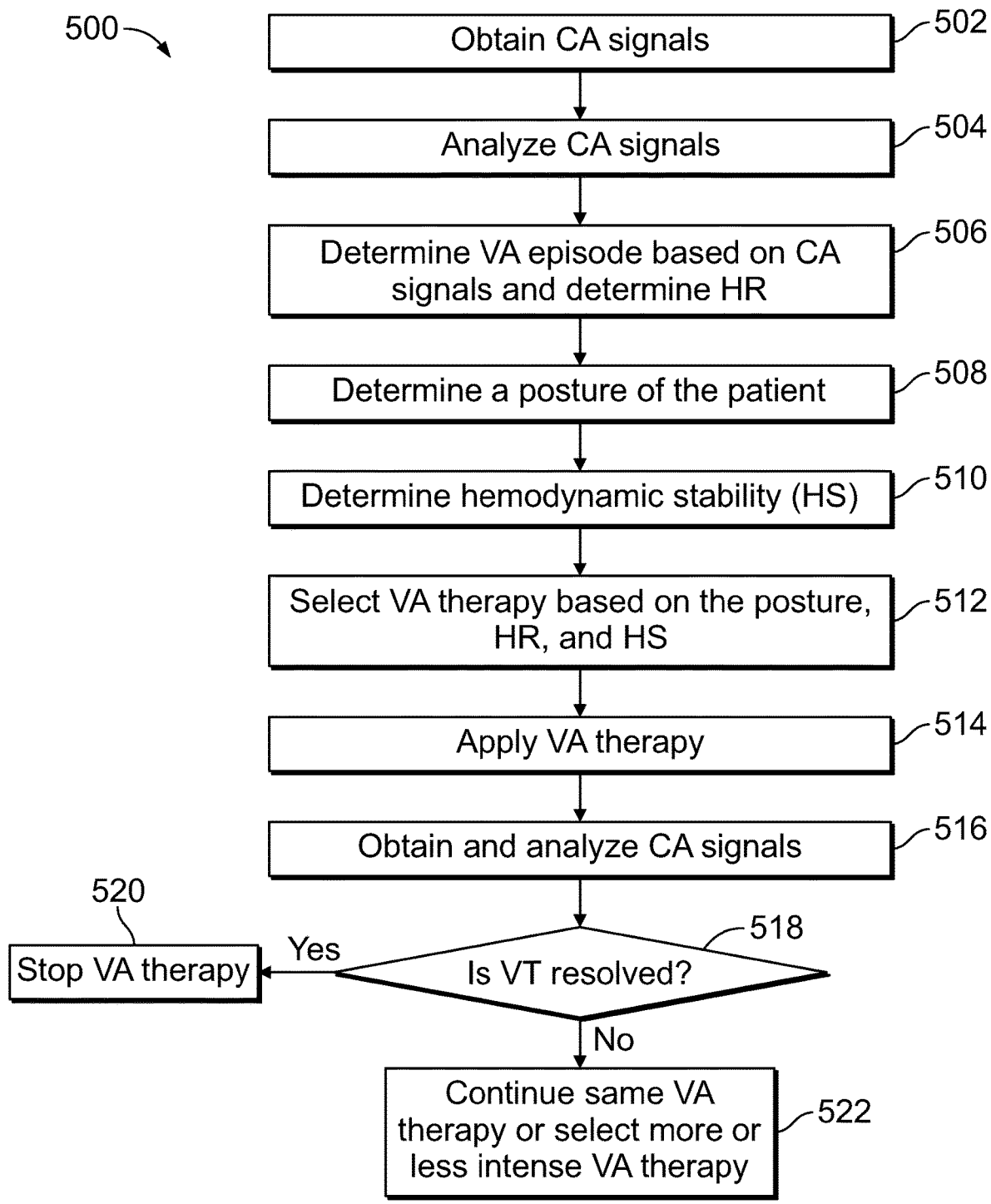
FIG. 5 illustrates a computer-implemented method for determining VA episode(s) and selecting a VA therapy based on a patient's posture, heart rate, and whether the patient is hemodynamically stable or unstable in accordance with embodiments of the present technology.

FIG. 5 illustrates a computer-implemented method 500 for determining VA episode(s) and selecting a VA therapy based on a patient's posture, heart rate, and whether the patient is hemodynamically stable or unstable in accordance with embodiments of the present technology. The operations of FIG. 5 may be implemented by hardware, firmware, circuitry and/or one or more processors housed partially and/or entirely within the IMD 102, a local external device, remote server or more generally within a health care system. Optionally, the operations of FIG. 5 may be partially implemented by an IMD 102 and partially implemented by a local external device, remote server or more generally within a health care system. For example, the IMD 102 includes IMD memory and one or more IMD processors, while each of the external devices/systems (e.g., local, remote or anywhere within the health care system) include external device memory and one or more external device processors. It should be recognized that while the operations of method 500 are described in a somewhat serial manner, one or more of the operations of method 500 may be continuous and/or performed in parallel with one another. For example, the various operations of the IMD 102 may be continuous and/or performed in parallel with one another and/or other functions of the IMD 102.

Some of the blocks of FIG. 4 are substantially similar to blocks of FIG. 4 and thus will not be described in great detail. At 502, the one or more processors of the IMD 102 obtain CA signals at the sensing electrodes during cardiac beats. At 504, the one or more processors of the IMD 102 analyze the CA signals to assess the presence or absence of an arrhythmia episode (e.g., a VA episode). At 506, the one or more processors of the IMD 102 determine a VA episode based on the CA signals. The one or more processors can also determine the heart rate (HR). At 508, the one or more processors of the IMD 102 determine a posture of the patient, such as by obtaining acceleration signatures at a physiological sensor, such as the accelerometer 114 (FIG. 1B) of the IMD 102 that are indicative of activity level and heart sounds generated during the cardiac beats. For example, the one or more processors can determine that the patient posture is supine, prone, left sided, right sided, upright, etc.

Although not shown in the flow of FIG. 5, the one or more processors of the IMD 102 can determine whether the posture is associated with high DFT, as was accomplished in FIG. 4. In some embodiments, upright and right sided postures are both associated with high DFT, which in some cases can require a VA therapy with a greater level of intensity to treat. Again, if the posture is associated with high DFT, the one or more processors of the IMD 102 optionally can alert the patient to change posture, such as to move to a supine, prone or left sided posture. Additionally or alternatively, the one or more processors can continue to evaluate the posture of the patient to determine whether the posture changes to a posture associated with low or lower DFT.

At 510, the one or more processors of the IMD 102 determine hemodynamic stability (HS) (e.g., whether the patient is hemodynamic stable or unstable) by determining whether the VA episode is stable or unstable, respectively. As discussed in further detail in U.S. Patent Application Publication 2020/0368536, filed May 20, 2019, titled "METHODS AND SYSTEMS FOR LABELING ARRHYTHMIAS BASED ON HEART SOUNDS", the complete subject matter which is expressly incorporated herein by reference in its entirety, the IMD 102 analyzes the acceleration signals, and in some cases also the CA signals, to determine whether the VA is a stable VA (e.g., hemodynamically stable) or an unstable VA (e.g., hemodynamically unstable).

For example, the one or more processors of the IMD 102 calculate and analyze characteristics of interest (COI) from the acceleration signatures and/or the CA signals to identify the VA episode as a stable or unstable VT episode. The COI may be one or more of S1 amplitude, S1 amplitude variation, a QRS to S1 interval, a QRS complex, and the like. In one example, calculating and analyzing the COI may include tracking a level of one or more COI during or after the VA episode. In another example, calculating and analyzing may include tracking the COI over a series of the cardiac beats. Based on the analyzing, the VA episode is determined to be a stable or unstable VA episode, and thus the patient is determined to be hemodynamically stable or unstable, respectively.

In one example, the COI is an S1 COI, S1 amplitude. The one or more processors of the IMD track a level of the S1 amplitude during or after the VA episode. In a stable VA episode, the right ventricular (RV) pulse pressure change may not be significantly reduced, whereas the RV pulse pressure reduction may be significant in an unstable VT episode. S1 amplitude, which correlates well with ventricular function, are expected to remain relatively unchanged in a stable VA episode but are significantly reduced in an unstable VA episode. Accordingly, by tracking the level of S1 amplitude, and changes therein, at the time of VA declaration and/or some time thereafter, the VA diagnosis may be verified, and the appropriate therapy administered. If the process determines that the S1 amplitude remains above an amplitude level threshold for a select portion of the VT episode, the one or more processors determine the VT episode to be a stable VT episode. If the process determines that the S1 amplitude falls below the amplitude level threshold for the select portion of the VT episode, the one or more processors determine the VT episode to be an unstable VT episode.

In another example, the COI is an S1 COI, S1 amplitude variation. The one or more processors of the IMD 102 track a level of the S1 amplitude variation during or after the VA episode. S1 amplitude is expected to vary in an unstable VA episode versus a stable VA episode, as the ventricles during an unstable VA episode are subject to greater beat-to-beat variability in ventricular contraction. As such, if the process determines that the S1 amplitude variation is less than an amplitude variation threshold for a select portion of the VA episode, the one or more processors determine the VA episode to be a stable VA episode. If the process determines that the S1 amplitude variation exceeds the amplitude variation threshold for the select portion of the VA episode, the one or more processors determine the VA episode to be an unstable VA episode.

In yet another example, the COI is an S1 COI and includes S1 amplitude level and variation. The one or more processors of the IMD 102 track a level and variation of the S1 amplitude during or after the VA episode. The combination of S1 amplitude level and variation may lead to improved differentiation over each parameter alone. If the process determines that the level and variation of the S1 amplitude has a first relationship to the variation and amplitude thresholds for a select portion of the VA episode, the one or more processors determine the VA episode to be a stable VA episode. If the process determines that the level and variation of the S1 amplitude has a second relationship to the variation and amplitude thresholds for a select portion of the VA episode, the one or more processors determine the VA episode to be a stable VA episode.

In a further example, the COI is a QRS to S1 interval. The QRS to S1 interval in a stable VA episode may remain within a selected threshold while the QRS to S1 interval in an unstable VA episode exceeds the selected threshold. Accordingly, the QRS to S1 variability may differentiate between a stable and an unstable VA episode. As such, the one or more processors of the IMD 102 identify, over a series of the cardiac beats, a QRS to S1 interval corresponding to a period of time between i) a feature of interest in a QRS complex of the corresponding cardiac beats and ii) a feature of interest in the S1 heart sound. If the process determines that the QRS to S1 variability over the series of cardiac beats is less than a QRS to S1 threshold, the one or more processors determine the VA episode to be a stable VA episode. If the process determines that the QRS to S1 variability over the series of cardiac beats exceeds the QRS to S1 variability threshold, the one or more processors determine the VA episode to be an unstable VA episode.

In yet another example, the COI includes a QRS complex. The one or more processors of the IMD 102 identify, over a series of the cardiac beats, a QRS complex from the corresponding cardiac beats, and detect skipped S1 heart sounds that do not occur within an S1 search window following a corresponding QRS complex. In order to detect skipped S1 heart sounds, the one or more processors detect S1 heart sounds in an S1 search window following a QRS complex and track the number of times an S1 heart sound does not occur in the S1 search window following each QRS detection over a series of cardiac beats. In a stable VA episode, the QRS and S1 association is expected to be maintained, whereas S1 may not occur in some QRS detections for an unstable VA detection. If the process determines that a number of skipped S1 heart sounds is maintained within a select range, the process determines the VA episode to correspond to a stable VA episode. If the process determines that a number of skipped S1 heart sounds is outside of a select range, the process determines the VA episode to correspond to an unstable VA episode.

It should be understood that other methods and systems may be used to determine whether the patient is hemodynamically stable. For example, a remote system that receives signals from an implanted device can be configured to provide information to the IMD 102. In other embodiments, a pressure sensor sensing signals from a portion of the heart, such as but not limited to a ventricle, pulse oximetry, etc., can be used.

At 512, the one or more processors of the IMD 102 select a first VA therapy based on the posture, heart rate (e.g., ventricular rate), and HS, as discussed previously with respect to FIG. 3. For example, the heart rate may be determined to be a low HR, intermediate HR, or high HR.

At 514, the one or more processors of the IMD 102 apply the VA therapy. In some cases that shock the patient with one or more coils, an intermediate therapy such as ATP may be applied during the ramp up period of the coil(s).

At 516, the one or more processors of the IMD 102 obtain and analyze the CA signals, and at 518 determine if the VA episode is resolved and normal rhythm has returned. If yes, at 520, the one or more processors of the IMD 102 can stop the VA therapy and return to normal monitoring and/or pacing operations. In some embodiments some low level of intensity VA therapy (e.g., ATP) may be maintained, such as for a predetermined amount of time.

If the VA episode is not resolved at 518, at 522 the one or more processors of the IMD 102 can continue the current VA therapy or select a VA therapy that has a greater level of intensity. In other embodiments, the one or more processors can select a less intense VA therapy.

As the VA therapy is provided to the patient, the one or more processors can continue to obtain and analyze the CA signals to determine the status of the VA episode (blocks 516 and 518), identify the posture of the patient (block 508), determine the heart rate of the patient (block 506), and determine the hemodynamic stability (block 510) to determine whether a VA therapy that has a lesser level of intensity or a greater level of intensity is appropriate.

For example, referring to FIG. 3, if the patient's heart rate is an intermediate heart rate and the VA episode changes from hemodynamically unstable to hemodynamically stable, for each posture the applied VA therapy can be changed to a less severe therapy. Further, if the posture is determined to change from, for example, upright to prone, the therapy can be changed from full shock strength with one coil 310 to ATP 304. This adjustment can have the benefit of positively impacting the quality of life of the patient, whereby the treatment level is adjusted to be a less painful intervention while still providing the desired therapeutic benefits.

FIG. 6 shows an example block diagram of the IMD 102 formed in accordance with embodiments herein. The IMD 102 may treat both fast and slow arrhythmias, including VA (e.g., further including VT, etc.), with stimulation therapy, including cardioversion, pacing stimulation, suspend tachycardia detection, tachyarrhythmia therapy, and/or the like. In some embodiments, the IMD 102 can be one of an implantable cardioverter defibrillator, pacemaker, cardiac rhythm management device, defibrillator, or leadless pacemaker but is not so limited.

The IMD 102 has a housing 640 to hold the electronic/computing components. The housing 640 (which is often referred to as the "can," "case," "encasing," or "case electrode") may be programmably selected to act as an electrode for certain sensing modes. Housing 640 further includes a connector (not shown) with at least one terminal 600 and optionally additional terminals 602, 604, 606, 608, 610. The terminals 600, 602, 604, 606, 608, 610 may be coupled to sensing electrodes that are provided upon or immediately adjacent the housing 640. Optionally, more or less than six terminals 600, 602, 604, 606, 608, 610 may be provided in order to support more or less than six sensing electrodes. Additionally or alternatively, the terminals 600, 602, 604, 606, 608, 610 may be connected to one or more leads having one or more electrodes provided thereon, where the electrodes are located in various locations about the heart. The type and location of each electrode may vary. The lead can be positioned in one of a transvenous, subcutaneous, or subxiphoid position. In some embodiments, the IMD 102 can be a subcutaneous IMD coupled to an extravascular lead having a first electrode 126 disposed along a distal segment of the lead and a second electrode 128 disposed along a proximal segment of the lead.

The IMD 102 includes a programmable microcontroller 620 that controls various operations of the IMD 102, including cardiac monitoring. Microcontroller 620 includes a microprocessor (or equivalent control circuitry), RAM and/or ROM memory, logic and timing circuitry 632, state machine circuitry, and I/O circuitry. The timing circuitry 632 can control the timing of the stimulation pulses (e.g., pacing rate, atrio-ventricular (AV) delay, atrial interconduction (A-A) delay, or ventricular interconduction (V-V) delay, etc.). Microcontroller 620 includes an arrhythmia detector 634 that is configured to analyze the cardiac activity (CA) signals over one or more cardiac beats to identify the existence of an arrhythmia. The microcontroller 620 can also include arrhythmia determination circuitry 635 for analyzing the CA signals to assess a presence or absence of R-waves within the cardiac beats. The microcontroller 620 and/or arrhythmia detector 634 can determine a VA episode based on the CA signals. In some embodiments, the microcontroller 620 determines a ventricular arrhythmia based on the absence of at least one R-wave from the cardiac beats.

In other embodiments, the arrhythmia detector 634 and/or arrhythmia determination circuitry 635 can include morphology detection to review and analyze one or more features of the morphology of cardiac signals. The arrhythmia detector 634 and/or arrhythmia determination circuitry 635 analyzes the cardiac signals indicative of cardiac events that are sensed by electrodes located proximate to one or more atrial and/or ventricular sites. The cardiac events are sensed over a period of time that includes a detection period that can be followed by an observation period. The cardiac events are analyzed in accordance with conventional ventricular arrhythmia algorithms, such as conventional tachycardia detection algorithms and/or fibrillation detection algorithms. Based on the analysis, the arrhythmia determination circuitry 635 can determine a ventricular arrhythmia episode, such as SVT block, a ventricular tachycardia episode or a ventricular fibrillation episode, etc.

Also, the microcontroller 620 further controls a shocking circuit 680 by way of a control signal 682. The shocking circuit 680 generates shocking pulses that are applied to the heart of the patient to terminate the detected arrhythmia through ATP, less than a full shock strength of one electrode, less than full shock strength with two electrodes, full shock strength with one electrode, full shock strength with two electrodes, etc. The shocking pulses may be selected from the primary electrode 126 and/or the secondary electrode 128 as shown in FIG. 1 or other electrodes/coils discussed herein. In some embodiments the housing 640 may act as an active electrode. The shocking circuit 630 can generate high-voltage and/or medium-voltage and the shocking coils (e.g., electrodes 126, 128) can be configured to deliver high-voltage or medium-voltage shocks.

A physiological sensor 670 (e.g., accelerometer) to obtain accelerometer data along at least one axis is implanted in a position and orientation such that, when the patient stands, the physiological sensor 670 and/or IMD 102 is located at a reference position and orientation with respect to a global coordinate system that is defined relative to a gravitational direction. For example, the gravitational direction may be along the Z-axis while the X-axis is between the left and right arms. Accordingly, in some embodiments one or more postures can be determined based on signals associated with one axis. In other embodiments, one or more of the postures can be determined based on signals associated with two or three axes. The microcontroller 620 can determine a posture of the patient based on the accelerometer data in response to the determination of the VA episode.

The physiological sensor 670 may be part of a monitoring system, or may represent one or more accelerometers, such as a three-dimensional (3D) accelerometer. The physiological sensor 670 may utilize one or more of piezoelectric, piezoresistive, capacitive and/or other appropriate component(s) to convert the mechanical motion of the 3D accelerometer into an electrical signal received by the microcontroller 620. By way of example, the 3-D accelerometer may have three outputs/channels that generate three corresponding electrical signals indicative of motion in three corresponding directions, namely X, Y and Z directions. The electrical signals associated with each of the three directional components may be divided into different frequency components to obtain different types of information therefrom.

The microcontroller 620 may utilize the signals from the physiologic sensor 670 in the manner described in U.S. Pat. No. 6,937,900, titled "AC/DC Multi-Axis Accelerometer For Determining A Patient Activity And Body Position," the complete subject matter which is expressly incorporated herein by reference in its entirety. While shown as being included within the housing 640, the physiological sensor 670 may be external to the housing 640, yet still, be implanted within or carried by the patient.

In one example the sensor 670 outputs different readings as a result of different positioning of the patient. For instance, if the IMD is placed on a flat surface, the z-axis of the accelerometer indicates 1 g (gravity) while the x and y axis gravity data are zero because each axis is perpendicular to gravity. If the patient changes position, a new position is represented by a unique combination of x, y, z values with respect to gravity. As such, the position of the IMD is indicative of gravity influencing 3-axes of the accelerometer that is unique to a particular position and is not the result of heart sound.

In one example, the acceleration signatures may be an AC-high frequency component from the 3-D accelerometer. The AC-high frequency component may correspond to one or more axes of the accelerometer and, additionally or alternatively, may represent a composite AC-high frequency component formed from a combination (e.g., a sum) of the AC-high frequency components from the three electrical signals. The composite AC-high frequency component generally represents the acceleration signature that is indicative of heart sounds produced during a corresponding cardiac cycle. The AC-high frequency component may include signals having a frequency of 10 KHz or more, and more preferably in the range of 10-100 kHz.

In yet another example, the three directional signals generated by the 3-D accelerometer may be passed through one or more bandpass filters 671 to separate the AC-high frequency component. The output of the bandpass filter 671, including primarily only AC-high frequency components, represents an acceleration signature indicative of heart sounds produced during a corresponding cardiac cycle. In one example, the sensor 670 may couple to a bandpass filter 671 for each axis of the accelerometer. In one example, each bandpass filter 671 is the same for each axis, whereas in other examples, each bandpass filter 671 may be different for each axis of the accelerometer. In yet another example, the two bandpass filters may be identical for two axes, and third bandpass filter may be different for a third axis. In an additional or alternative example, in order to detect activity levels, the 3-D accelerometer may include another bandpass filter 671 that may have a different sensitivity setting. In yet another example, each bandpass filter 671 may have two filter settings, with a first filter setting between 7.5-100 Hz and a second filter setting between 15-100 Hz. In such an example, the filter with the 7.5 Hz lower −3 dB is ideal for collecting higher frequency contents, such as provided by a first heart sound S3, whereas the filter with 15 Hz lower −3 dB is a better option in collecting higher frequency content such as a second heart sound S1 or S2 while minimizing low frequency drift, or noise. Therefore, depending on the desired content of the heart sound or frequency characteristics of heart sound or activity level data of interest, a different filter, or setting may be utilized. Specifically, the microcontroller 220 may command the bandpass setting based on operational and patient conditions.

The microcontroller 620 may also include calibration circuitry 636 that obtains calibration acceleration signatures at one or more physiological sensor 670 (e.g., which include accelerometer circuit(s), one or more accelerometer, such as accelerometer 114 (FIGS. 1A, 1B), etc.) that is indicative of heart sounds. Among other things, the calibration circuitry 636 obtains baseline accelerometer signals from the physiological sensor 670 in connection with patient postures. The postures may include supine, prone, lying on a right side, lying on a left side, angled, upright, and/or the like. In one example, the acceleration signatures are indicative of heart sounds generated in connection with first and second postures of a patient. The calibration circuitry 636 may also calculate synthetic baseline accelerometer signals based on orthogonal baseline accelerometer signals that are directly measured by the physiological sensor 670. After the calibration procedure, the calibration circuitry 636 utilizes the calibration acceleration signatures to determine an axis of the accelerometer associated with a current posture. The confirmation acceleration signatures can be obtained along the axis of the accelerometer in connection with analyzing the far field CA signals.

The microcontroller 620 may also include an acceleration signature analysis (ASA) module 637 configured to implement one or more of the operations discussed herein. The ASA module 637 is configured to be a computer implemented method for detecting arrhythmias in cardiac activity. The ASA module 637 obtains cardiac activity (CA) signals, at the electrodes of an IMD, in connection with multiple cardiac beats and in connection with different IMD locations relative to gravitational force. Further, the physiological sensor 670 can obtain acceleration signatures indicative of heart sounds generated during the cardiac beats and obtain device location information, at the IMD, with respect to the gravitational force during the cardiac beats. The ASA module 637 evaluates the acceleration signatures for characteristics of ventricular events (VEs), such as an arrhythmia episode (e.g., a VA episode) determined by the arrhythmia determination circuitry 635.

Although not shown, the microcontroller 620 may further include other dedicated circuitry and/or firmware/software components that assist in monitoring various conditions of the patient's heart and managing pacing therapies.

A switch 626 is optionally provided to allow selection of different electrode configurations under the control of the microcontroller 620. The electrode configuration switch 626 may include multiple switches for connecting the desired electrodes to the appropriate I/O circuits, thereby facilitating electrode programmability. The switch 626 is controlled by a control signal 628 from the microcontroller 620. Optionally, the switch 626 may be omitted and the I/O circuits directly connected to a housing electrode via terminal 600 and one or more other electrodes via terminals 602, 604, 606, 608, 610.

The IMD 102 is further equipped with a communication modem (modulator/demodulator) 642 to enable wireless communication with other devices, implanted devices, and/or external devices. In one implementation, the communication modem 642 uses high frequency modulation, for example using RF, Bluetooth or Bluetooth Low Energy telemetry protocols. The signals are transmitted in a high frequency range and will travel through the body tissue in fluids without stimulating the heart or being felt by the patient. The communication modem 642 may be implemented in hardware as part of the microcontroller 620, or as software/firmware instructions programmed into and executed by the microcontroller 620. Alternatively, the modem 642 may reside separately from the microcontroller as a standalone component. The modem 642 facilitates data retrieval from a remote monitoring network. The modem 642 enables timely and accurate data transfer directly from the patient to an electronic device utilized by a physician.

The IMD 102 includes sensing circuit 644 selectively coupled to one or more electrodes that perform sensing operations, through the switch 626 to sense cardiac activity data/signals indicative of cardiac activity. The sensing circuit 644 may include dedicated sense amplifiers, multiplexed amplifiers, or shared amplifiers. It may further employ one or more low power, precision amplifiers with programmable gain and/or automatic gain control, bandpass filtering, and threshold detection circuit to selectively sense the features of interest. In one embodiment, switch 626 may be used to determine the sensing polarity of the cardiac signal by selectively closing the appropriate switches.

In the example of FIG. 6, a single sensing circuit 644 is illustrated. Optionally, the IMD 102 may include multiple sensing circuits, similar to sensing circuit 644, where each sensing circuit is coupled to two or more electrodes and controlled by the microcontroller 620 to sense electrical activity detected at the corresponding two or more electrodes. The sensing circuit 644 may operate in a unipolar sensing configuration or a bipolar sensing configuration. Optionally, the sensing circuit 644 may be removed entirely, and the microcontroller 620 performs the operations described herein based upon the CA signals from the A/D data acquisition system 650 directly coupled to the electrodes. The output of the sensing circuit 644 is connected to the microcontroller 620 which, in turn, determines when to store the cardiac activity data of CA signals (digitized by the A/D data acquisition system 650) in a memory 660.

In some embodiments, the A/D data acquisition system 650 is coupled to one or more electrodes via the switch 626 to sample cardiac activity signals across any pair of desired electrodes. The ASA module 637 may be applied to signals from the sensing circuit 644 and/or the A/D data acquisition system 650.

By way of example, the external device 654 may represent a bedside monitor installed in a patient's home and utilized to communicate with the IMD 102 while the patient is at home, in bed or asleep. The external device 654 may be a programmer used in the clinic to interrogate the IMD 102, retrieve data and program detection criteria and other features. The external device 654 may be a handheld device (e.g., smartphone, tablet device, laptop computer, smartwatch and the like) that may be coupled over a network (e.g., the Internet) to a remote monitoring service, medical network and the like. The handheld device can receive alerts from the IMD 102 that tell the patient to change posture. The alerts can be vibrations, sounds, displayed on a display, etc. The external device 654 may communicate with a telemetry circuit 664 of the IMD 102 through a communication link 666. The external device 654 facilitates access by physicians to patient data as well as permitting the physician to review real-time CA signals while collected by the IMD 102.

The microcontroller 620 is coupled to a memory 660 by a suitable data/address bus 662. The memory 660 stores device parameters associated with each therapy in a collection of VA therapies with different levels of intensity. The levels of intensity for the collection of VA therapies include at least one of i) different energy levels, ii) different types of therapy, or iii) different electrode combination. Further, the collection of VA therapies includes at least one of i) delivering less than a maximal energy with one coil, ii) delivering less than a maximal energy with two coils, iii) delivering maximal energy with one coil, iv) delivering maximal energy with two coils, and/or v) delivering ATP. The memory 660 stores the acceleration signatures, reference posture data sets, cardiac activity signals, as well as the markers and other data content associated with detection and determination of the arrhythmia.

The microcontroller 620 also includes a VA therapy selection module 638 for selecting VA therapies from within the collection of VA therapies stored in the memory 660. For example, the VA therapy selection module 638 can select a first VA therapy from the collection of VA therapies based on the posture, and the first VA therapy can be applied. The collection of VA therapies can include a second VA therapy, and the second VA therapy can have a greater level of intensity than the level of intensity associated with the first VA therapy. In response to the microcontroller 620 determining the posture as one of upright and right sided, the first VA therapy has less than a greatest level of intensity from within the different levels of intensity, and more than a least level of intensity from within the different levels of intensity. In response to the microcontroller 620 determining that the VA episode is still occurring after implementing the first VA therapy, the VA therapy selection module 638 selects a second VA therapy that has a greater level of intensity than the first VA therapy. The microcontroller 620 can direct the shocking circuit 680, ATP pulse generator 690, etc., to apply the appropriate therapy. In response to the microcontroller 620 determining the posture as one of supine and left sided, the first VA therapy selected by the VA therapy selection module 638 has a lesser level of intensity than if the posture is one of upright and right sided.

The microcontroller 620 can determine the VA episode to be hemodynamically stable or unstable based on at least one of the accelerometer data or the CA signals, and the VA therapy selection module 638 can select the first VA therapy from the collection of VA therapies based on the posture and on whether the VA episode is hemodynamically stable or unstable. The microcontroller 620 and/or arrhythmia detector 634 can determine a heart rate based on the VA episode, and in response to the heart rate being determined an intermediate heart rate, the VA therapy selection module 638 can select the VA therapy to have a greater level of intensity when the posture is one of i) upright, ii) right sided, or iii) left sided compared to the level of intensity when the posture is one of i) prone or ii) supine. The microcontroller 620 can further implement a method to deliver a first VA therapy when the VA episode is determined to be stable, and deliver a second VA therapy when the VA episode is determined to be unstable, wherein the first and second VA therapies have different levels of intensity.

One or more processors of the microcontroller 620 can implement a method comprising utilizing the sensing circuit 644 to sense cardiac activity (CA) signals from within a patient, wherein the sensing circuit 644 is implanted in the patient. The method utilizes an accelerometer 114 (e.g., physiological sensor 670) to obtain accelerometer data along at least one axis, wherein the accelerometer 114 is implanted in the patient. The method analyzes the CA signals over one or more cardiac beats, determines a VA episode based on the CA signals, determines a posture of the patient based on the accelerometer data, and selects, such as with the VA therapy selection module 638, a first VA therapy from a collection of VA therapies based on the posture, wherein the collection of VA therapies includes a plurality of VA therapies with different levels of intensity. In response to applying the first VA therapy, the microcontroller 620 can further implement the method of analyzing the CA signals over one or more cardiac beats, determining an absence of the VA episode based on the CA signals, and stopping the first VA therapy.

A battery 672 provides operating power to all of the components in the IMD 102. The battery 672 is capable of operating at low current drains for long periods of time. The battery 672 also desirably has a predictable discharge characteristic so that elective replacement time may be detected. As one example, the housing 640 employs lithium/silver vanadium oxide batteries. The battery 672 may afford various periods of longevity (e.g., three years or more of device monitoring). In alternate embodiments, the battery 672 could be rechargeable. See, for example, U.S. Pat. No. 7,294,108, titled "Cardiac event micro-recorder and method for implanting same", which is hereby incorporated by reference in its entirety.

The IMD 102 further includes an impedance measuring circuit 674, which can be used for many things, including: lead impedance surveillance for proper lead positioning or dislodgement; detecting operable electrodes and automatically switching to an operable pair if dislodgement occurs; measuring thoracic impedance for determining shock thresholds; detecting when the device has been implanted; measuring stroke volume; and detecting the opening of heart valves; and so forth. The impedance measuring circuit 674 is coupled to the switch 626 so that any desired electrode may be used.

The IMD 102 further includes a first chamber pulse generator 690 that generates stimulation pulses for delivery by one or more electrodes coupled thereto. The pulse generator 690 is controlled by the microcontroller 620 via control signal 692. The pulse generator 690 is coupled to the select electrode(s) via the electrode configuration switch 626, which includes multiple switches for connecting the desired electrodes to the appropriate I/O circuits, thereby facilitating electrode programmability.

In some embodiments, the output of the sensing circuit 644 is connected to the microcontroller 620 which, in turn, triggers or inhibits the pulse generator 690 in response to the absence or presence of cardiac activity. The sensing circuit 644 receives a control signal 694 from the microcontroller 620 for purposes of controlling the gain, threshold, polarization charge removal circuitry (not shown), and the timing of any blocking circuitry (not shown) coupled to the inputs of the sensing circuitry.

Figure 7:
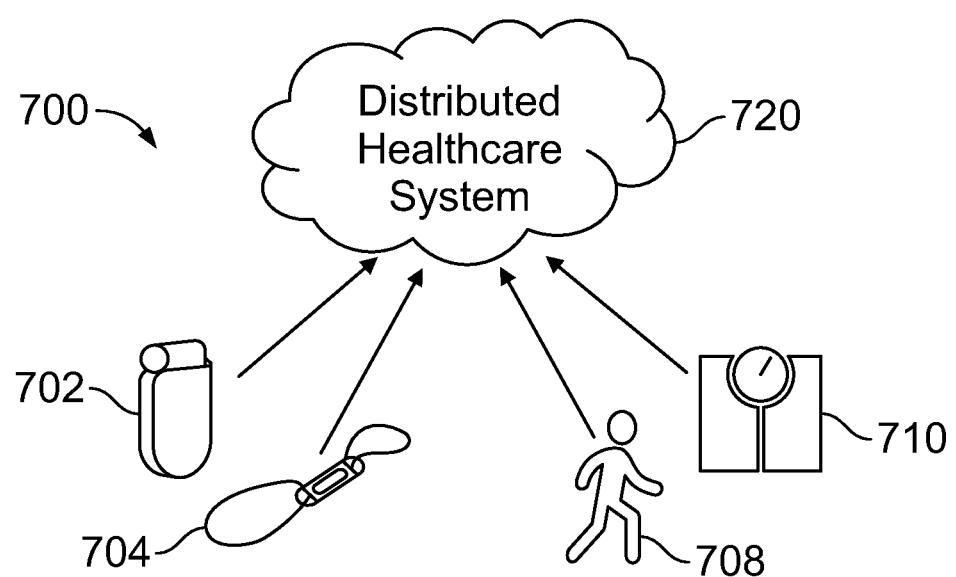
FIG. 7 illustrates a digital healthcare system implemented in accordance with embodiments herein.

FIG. 7 illustrates a digital healthcare system 700 implemented in accordance with embodiments herein. The system 700 integrates accelerometer signals and the other information derived from accelerometer signals with other health data in connection with monitoring a patient condition, progression of a health condition, trends in a patient's health condition, treatment, changes in therapy/medication and the like. The healthcare system 700 may include wearable devices that communicate with an IMD 102 or accelerometer 114 and a remote database. As a result, the healthcare system 700 may monitor health parameters of patient, including VA episodes, applied VA therapies, etc., and provide a diagnosis for the patient based on the monitored health parameters.

The system 700 may be implemented with various architectures, which are collectively referred to as a healthcare system 720. By way of example, the healthcare system 720 may be implemented as described herein. The healthcare system 720 is configured to receive data, including IMD data, from a variety of external and implantable sources including, but not limited to, active IMDs 702 capable of delivering therapy to a patient (e.g., IMD 102), passive IMDs or sensors 704 (e.g., accelerometer 114, physiological sensor 670), wearable sensors 708 (e.g., accelerometer 114), and point-of-care (POC) devices 710 (e.g., at home or at a medical facility). Any of the IMD 702, sensor 704, and/or sensor 708 may implement accelerometer circuitry and perform the analysis of accelerometer signals as described herein. The data from one or more of the external and/or implantable sources is collected and communicated to one or more secure databases within the healthcare system 720. Optionally, the patient and/or other users may utilize a device, such as a smart phone, tablet device, etc., to enter data. For example, a patient may use a smart phone to provide feedback concerning activities performed by the patient, a patient diet, nutritional supplements and/or medications taken by the patient, how a patient is feeling (e.g., tired, dizzy, weak, good), etc.

Closing

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Some or all of the Figures herein illustrate various methods and processes implemented in accordance with embodiments herein. The operations herein may be implemented by hardware, firmware, circuitry and/or one or more processors housed partially and/or entirely within an IMD, a local external device, remote server or more generally within a health care system. Optionally, the operations herein may be partially implemented by an IMD and partially implemented by a local external device, remote server or more generally within a health care system. For example, the IMD includes IMD memory and one or more IMD processors, while each of the external devices/systems (ED) (e.g., local, remote or anywhere within the health care system) include ED memory and one or more ED processors.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD- ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. The program instructions may be provided to a processor of a general-purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It should be recognized that, to the extent embodiments herein are described to apply certain mathematical combinations of select variables, the same variables may be combined in other mathematical combinations that are also indicative of the same result. For example, when a single data point is utilized for a particular variable, additionally or alternatively, a mean, average, sum, or other mathematical combination of multiple data points may be utilized for the same variable.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc., are used merely as labels, and are not intended to impose numerical requirements on their objects or order of execution on their acts.

What is claimed is:

1. An implantable medical device (IMD), comprising:
   a sensing circuit configured to sense cardiac activity (CA) signals;
   an accelerometer configured to be implanted in a patient, the accelerometer configured to obtain accelerometer data along at least one axis;
   memory configured to store program instructions and to store device parameters associated with ventricular arrhythmia (VA) therapies in a collection of VA therapies with different levels of intensity, each of the VA therapies having associated device parameters;
   at least two coils configured to deliver the VA therapies; and one or more processors that, when executing the program instructions, are configured to:
    analyze the CA signals over one or more cardiac beats;
    determine a VA episode based on the analysis of the CA signals;
    determine a posture of the patient based on the accelerometer data in response to the determination of the VA episode;
    select a first VA therapy from the collection of VA therapies based on the posture; and
    apply the first VA therapy using at least one of the at least two coils.

2. The IMD of claim 1, wherein the collection of VA therapies further includes a second VA therapy, the second VA therapy having a greater level of intensity than the level of intensity associated with the first VA therapy.

3. The IMD of claim 1, wherein in response to determining the posture as one of upright and right sided, the first VA therapy has less than a greatest level of intensity from within the different levels of intensity, and more than a least level of intensity from within the different levels of intensity.

4. The IMD of claim 1, in response to determining that the VA episode is still occurring after applying the first VA therapy, the one or more processors is further configured to select a second VA therapy that has a greater level of intensity than the first VA therapy.

5. The IMD of claim 1, wherein in response to determining the posture as one of supine and left sided, the first VA therapy has a lesser level of intensity than if the posture is one of upright and right sided.

6. The IMD of claim 1, wherein each of the levels of intensity for the collection of VA therapies includes at least one of: i) different energy levels, ii) different types of therapy, or iii) different electrode combination.

7. The IMD of claim 1, wherein the collection of VA therapies includes at least one of: i) delivering less than a maximal energy with one coil, ii) delivering less than a maximal energy with two coils, iii) delivering maximal energy with one coil, iv) delivering maximal energy with two coils, or v) delivering anti-tachycardia pacing (ATP).

8. The IMD of claim 1, wherein the one or more processors is further configured to:
    determine the VA episode to be hemodynamically stable or unstable based on at least one of the accelerometer data or the CA signals; and
    select the first VA therapy from the collection of VA therapies based on the posture and on whether the VA episode is hemodynamically stable or unstable.

9. The IMD of claim 1, wherein the one or more processors is further configured to:
    determine a heart rate based on the VA episode; and
    in response to the heart rate being determined an intermediate heart rate, select the VA therapy to have a greater level of intensity when the posture is one of i) upright, ii) right sided, or iii) left sided compared to the level of intensity when the posture is one of i) prone or ii) supine.

10. The IMD of claim 1, wherein the IMD is coupled to a lead that is positioned in one of a transvenous, subcutaneous, or subxiphoid position, and wherein the IMD is one of implantable cardioverter defibrillator, pacemaker, cardiac rhythm management device, or defibrillator.

11. The IMD of claim 1, wherein the IMD is a subcutaneous IMD coupled to an extravascular lead having a first electrode disposed along a distal segment of the lead and a second electrode disposed along a proximal segment of the lead.

12. A computer implemented method, comprising:
    sensing cardiac activity (CA) signals utilizing a sensing circuit implanted within a patient;
    obtaining accelerometer data along at least one axis utilizing an accelerometer implanted within the patient;
    analyzing, utilizing one or more processors implanted within the patient to execute program instructions, the CA signals over one or more cardiac beats;
    determining, utilizing the one or more processors, a VA episode based on the CA signals;
    determining, utilizing the one or more processors, a posture of the patient based on the accelerometer data;
    selecting, utilizing the one or more processors, a first VA therapy from a collection of VA therapies based on the posture, wherein the collection of VA therapies includes a plurality of VA therapies with different levels of intensity; and
    applying the first VA therapy.

13. The method of claim 12, wherein the collection of VA therapies further includes a second VA therapy, the second VA therapy having a greater level of intensity than the level of intensity associated with the first VA therapy.

14. The method of claim 12, wherein in response to determining the posture as one of upright and right sided, the first VA therapy has less than a greatest level of intensity from within the different levels of intensity, and more than a least level of intensity from within the different levels of intensity.

15. The method of claim 12, wherein in response to determining that the VA episode is still occurring after implementing the first VA therapy, selecting a second VA therapy that has a greater level of intensity than the first VA therapy.

16. The method of claim 12, wherein in response to determining the posture as one of supine and left sided, the first VA therapy has a lesser level of intensity than if the posture is one of upright and right sided.

17. The method of claim 12, further comprising:
    determining the VA episode to be hemodynamically stable or unstable based on at least one of the accelerometer data or the CA signals; and
    selecting the first VA therapy from the collection of VA therapies based on the posture and on whether the VA episode is hemodynamically stable or unstable.

18. The method of claim 12, further comprising:
    determining a heart rate based on the VA episode; and
    in response to the heart rate being determined an intermediate heart rate, selecting the VA therapy to have a greater level of intensity when the posture is one of i) upright, ii) right sided, or iii) left sided compared to the level of intensity when the posture is one of i) prone or ii) supine.

19. The method of claim 12, further comprising:
    in response to applying the first VA therapy, analyzing the CA signals over one or more cardiac beats;
    determining an absence of the VA episode based on the CA signals; and
    stopping the first VA therapy.

20. The method of claim 12, further comprising:
    applying the first VA therapy when the VA episode is determined to be stable; and
    applying a second VA therapy when the VA episode is determined to be unstable, wherein the first and second VA therapies have different levels of intensity.

* * * * *